US010786797B2

(12) United States Patent
Panchal

(10) Patent No.: US 10,786,797 B2
(45) Date of Patent: Sep. 29, 2020

(54) ESTIMATION OF CYCLONE LIFE BASED ON REMAINING ABRASION RESISTANT LINING THICKNESS

(71) Applicant: UOP LLC, Des Plaines, IL (US)

(72) Inventor: Dharmesh Chunilal Panchal, Surbiton (GB)

(73) Assignee: UOP LLC, Des Plaines, IL (US)

(*) Notice: Subject to any disclaimer, the term of this patent is extended or adjusted under 35 U.S.C. 154(b) by 214 days.

(21) Appl. No.: 16/141,478

(22) Filed: Sep. 25, 2018

(65) Prior Publication Data
US 2020/0094211 A1    Mar. 26, 2020

(51) Int. Cl.
| B01J 19/02 | (2006.01) |
| B01J 8/18 | (2006.01) |
| B01J 8/00 | (2006.01) |
| C10G 75/00 | (2006.01) |
| C10G 11/18 | (2006.01) |

(52) U.S. Cl.
CPC .......... *B01J 8/1809* (2013.01); *B01J 8/0055* (2013.01); *B01J 19/02* (2013.01); *C10G 11/187* (2013.01); *C10G 75/00* (2013.01); *B01J 2208/00548* (2013.01); *B01J 2208/00725* (2013.01); *B01J 2208/00761* (2013.01); *B01J 2219/0204* (2013.01)

(58) Field of Classification Search
CPC ....... B04C 11/00; C10G 75/00; C10G 11/187; B01J 19/02; B01J 8/1809; B01J 2219/0204; B01J 8/0055; B01J 2208/00761; B01J 2208/00548; B01J 2208/00725; G01B 17/00; G01N 17/00
See application file for complete search history.

(56) References Cited

U.S. PATENT DOCUMENTS

| 2,878,891 | A | * | 3/1959 | Ross | .................... B01D 45/16 96/377 |
| 2,892,262 | A | * | 6/1959 | Shirk | .................... B01J 8/0278 34/585 |
| 2,937,988 | A | * | 5/1960 | Polack | .................... C10G 9/32 208/127 |
| 3,113,095 | A | * | 12/1963 | Braca | .................... B01J 8/18 208/153 |

(Continued)

FOREIGN PATENT DOCUMENTS

WO    2011077235 A1    6/2011

*Primary Examiner* — Shogo Sasaki
(74) *Attorney, Agent, or Firm* — Paschall & Associates, LLC; James C. Paschall

(57) ABSTRACT

A Fluid Catalytic Cracking process converts heavy crude oil fractions into lighter hydrocarbon products at high temperature and moderate pressure in the presence of a catalyst. During this process, catalyst particles stay entrained in the descending gas stream. An inlet scroll on the cyclone may be used to keep the inlet gas stream and the entrained particles away from the entrance to the gas outlet tube. Refractory material may applied to the interior of the wall of the cyclone to form an abrasion resistant lining to insulate the walls of the cyclone from the gas flow contents. The inlet feed velocity may be used as a predictive factor to determine a wear rate of the cyclones. Thus, lining erosion can be predicted so that the lining can be repaired or replaced during a planned turnaround.

20 Claims, 14 Drawing Sheets

(56) References Cited

U.S. PATENT DOCUMENTS

| | | | | |
|---|---|---|---|---|
| 3,988,236 A | * | 10/1976 | Albright | C10G 1/00 |
| | | | | 208/408 |
| 4,200,494 A | * | 4/1980 | Welter | B01J 8/0015 |
| | | | | 201/22 |
| 4,218,287 A | * | 8/1980 | Albright | B01J 8/0015 |
| | | | | 201/31 |
| 4,310,411 A | * | 1/1982 | Wilkening | C10G 11/18 |
| | | | | 208/153 |
| 4,782,345 A | | 11/1988 | Landt | |
| 2008/0193340 A1 | * | 8/2008 | Cocco | B01J 8/1818 |
| | | | | 422/143 |
| 2013/0008649 A1 | * | 1/2013 | Vestbostad | G01N 3/56 |
| | | | | 166/250.05 |
| 2020/0165196 A1 | * | 5/2020 | Nagata | B01J 23/002 |

\* cited by examiner

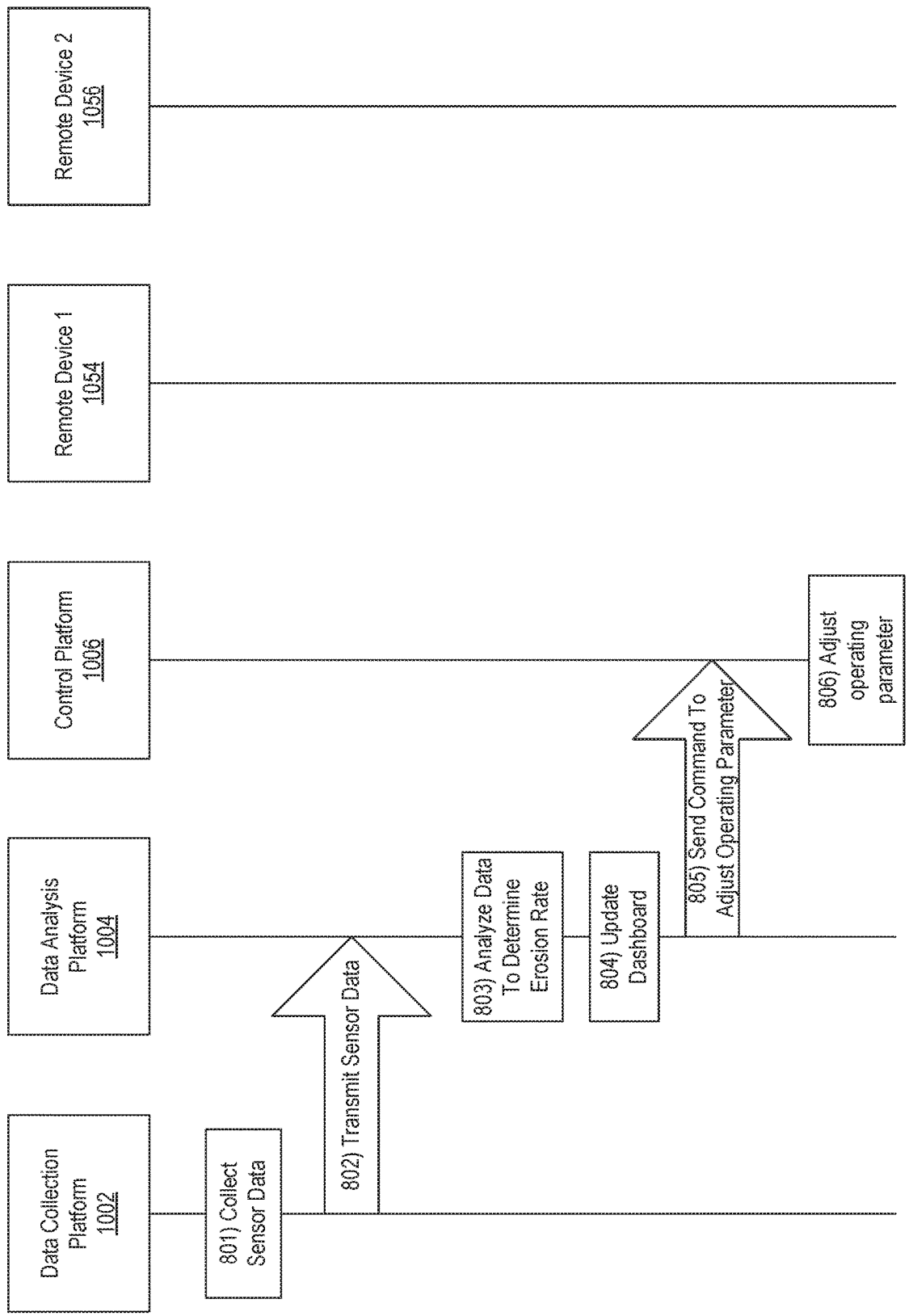

US 10,786,797 B2

ESTIMATION OF CYCLONE LIFE BASED ON REMAINING ABRASION RESISTANT LINING THICKNESS

FIELD

The present disclosure is related to a method and system for managing the operation of a plant, such as a chemical plant or a petrochemical plant or a refinery, and more particularly to a method for improving the performance of components that make up operations in a plant. Typical plants may be those that provide catalytic dehydrogenation or hydrocarbon cracking, or catalytic reforming, or other process units.

BACKGROUND

Fluid catalytic crackers (FCCs) have cyclones as catalyst retention devices in reactors and regenerators. Primary causes for unplanned shutdowns of FCCs relate to catalyst loss issues. One of the leading reasons for catalyst loss is deterioration or erosion of the abrasion resistant lining (ARL) inside the cyclones. Such erosion is difficult to predict and often overlooked due to the difficulty of assessing such erosion. Such erosion is often discovered during turnaround and results in extension of the turnaround period due to unplanned repairs of the ARL. Currently, the industry does not have any accurate means to estimate the run length of a cyclone based on the thickness of the ARL and thus cannot predict the extent of repair required in the cyclones during turnarounds.

SUMMARY

The following summary presents a simplified description of certain features. The summary is not an extensive overview and is not intended to identify key or critical elements.

One or more embodiments may include a system for monitoring the erosion of an abrasion resistant lining (ARL) inside the cyclones of a reactor and/or regenerator and utilizing the results thereof to predict the thickness of the ARL. Other embodiments may include a method for monitoring erosion rate of an ARL inside the cyclones of a reactor and/or regenerator and utilizing the results thereof to predict the thickness of the ARL.

Other technical features may be readily apparent to one skilled in the art from the following figures, descriptions, and claims.

BRIEF DESCRIPTION OF DRAWINGS

The present disclosure is illustrated by way of example and not limited in the accompanying figures in which like reference numerals indicate similar elements and in which:

FIG. 8 depicts an illustrative flow diagram of one or more steps that one or more devices may perform in controlling one or more aspects of a plant operation based on a predicted erosion rate, in accordance with one or more example embodiments.

DETAILED DESCRIPTION

Figure 1:
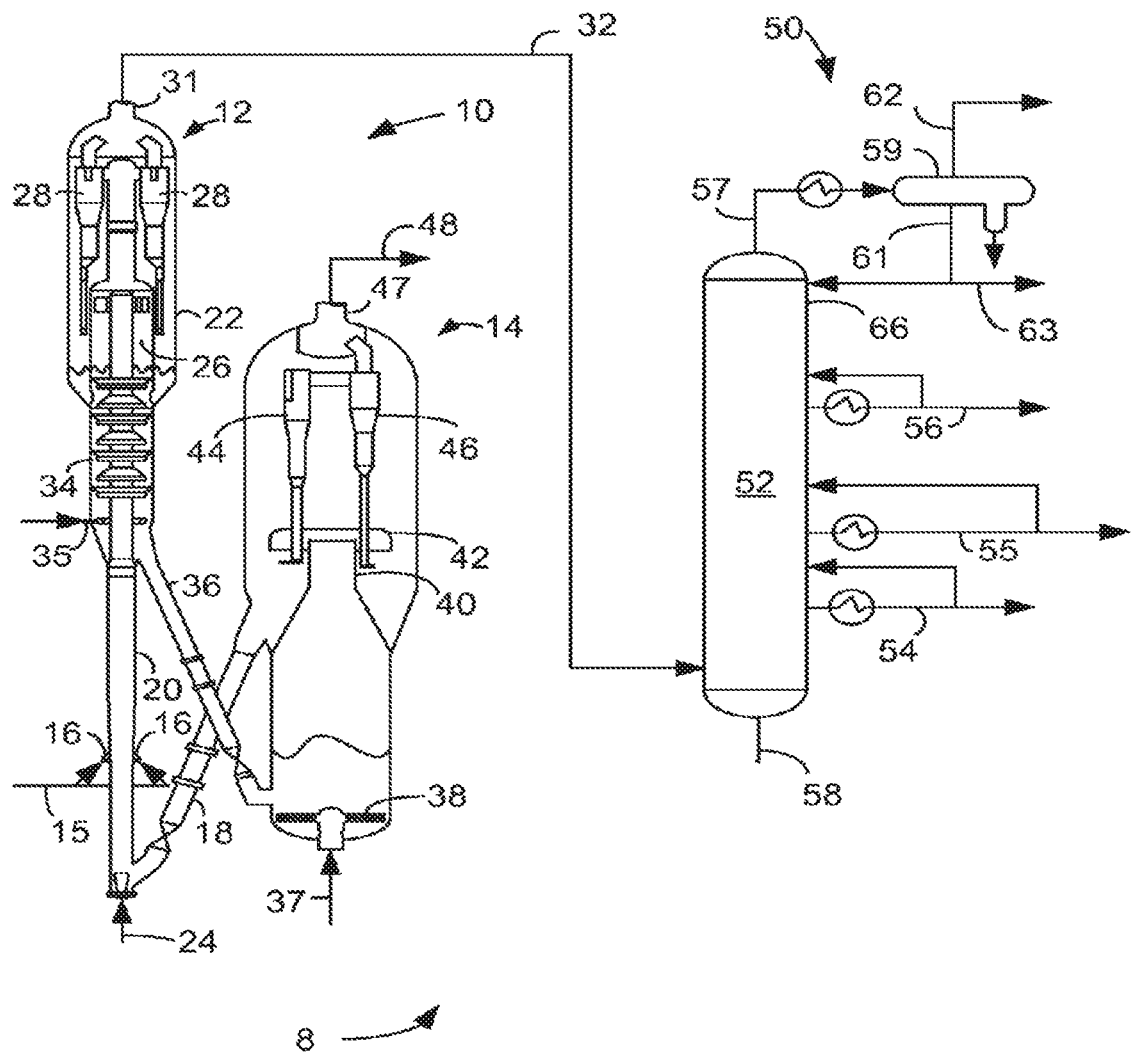
FIG. 1 depicts an illustrative arrangement for a fluid catalytic cracking process in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A chemical plant or a petrochemical plant or a refinery may include one or more pieces of equipment that process one or more input chemicals to create one or more products. For example, catalytic dehydrogenation can be used to convert paraffins to the corresponding olefin, e.g., propane to propene, or butane to butene. References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, technical advisors, specialists (e.g., in instrumentation, pipe fitting, and welding), shift personnel, and others interested in, starting up, overseeing, monitoring operations of, and shutting down, the plant.

A Fluid Catalytic Cracking (FCC) process converts heavy crude oil fractions into lighter, more valuable hydrocarbon products at high temperature and moderate pressure in the presence of a silica/alumina based catalyst. In the course of cracking large hydrocarbon molecules into smaller molecules, nonvolatile carbonaceous material, commonly referred to as coke, is deposited on the catalyst. The coke laid down on the catalyst acts to deactivate the catalytic cracking activity of the catalyst by blocking access to the active catalytic sites. In order to regenerate the catalytic activity of the catalyst, the coke deposited on the catalyst is burned off with air in a regenerator vessel.

One of the important advantages of fluid catalytic cracking is the ability of the catalyst to flow easily between the reactor and the regenerator when fluidized with an appropriate vapor phase. The vapor phase on the reactor side contains vaporized hydrocarbon and steam, while on the regenerator side the fluidization media is air and combustion gases. In this way, fluidization permits hot regenerated catalyst to contact fresh feed; the hot catalyst vaporizes the liquid feed and catalytically cracks the vaporized feed to form lighter hydrocarbon products. After the gaseous hydrocarbons are separated from the spent catalyst, the hydrocarbon vapor is cooled and then fractionated into the desired product streams. The separated spent catalyst flows via steam fluidization from the reactor to the regenerator vessel where the coke is burned off the catalyst to restore its activity. In the course of burning the coke, a large amount of heat is liberated. Most of this heat of combustion is absorbed by the regenerated catalyst and is carried back to the reactor by the fluidized regenerated catalyst to supply the heat required to drive the reaction side of the process. The ability to continuously circulate fluidized catalyst between the reactor and the regenerator allows the FCC to operate efficiently as a continuous process.

FIG. 1 illustrates an apparatus and process 8 that is equipped for processing a fresh hydrocarbon feed stream. The apparatus and process 8 generally include an FCC unit 10 and an FCC recovery section 50. The FCC unit 10 includes an FCC reactor 12 comprising a riser 20 and a catalyst regenerator 14. The FCC feed stream in the FCC feed line 15 is fed to the riser 20 via distributors 16 to be contacted with a regenerated cracking catalyst. Regenerated cracking catalyst entering from a regenerated catalyst standpipe 18 is contacted with the FCC feed stream in the riser 20 of the FCC reactor 12. In the riser 20 of the FCC reactor 12, the FCC feed stream is contacted with catalyst to catalytically crack the FCC feed stream to provide a cracked stream.

The contacting of the FCC feed stream with cracking catalyst may occur in the riser 20 of the FCC reactor 12, extending upwardly to the bottom of a reactor vessel 22. The contacting of feed and catalyst is fluidized by gas from a fluidizing line 24. Heat from the catalyst vaporizes the FCC feed stream, and the FCC feed stream is thereafter cracked to lighter molecular weight hydrocarbons in the presence of the cracking catalyst as both are transferred up the riser 20 into the reactor vessel 22. The cracked stream of hydrocarbon products in the riser 20 is thereafter disengaged from the cracking catalyst using cyclonic separators which may include a rough cut separator 26 and one or two stages of cyclones 28 in the reactor vessel 22. A cracked stream of product gases exit the reactor vessel 22 through a product outlet 31 to line 32 for transport to a downstream FCC recovery section 50.

Inevitable side reactions occur in the riser 20 leaving coke deposits on the catalyst that lower catalyst activity. The spent or coked catalyst requires regeneration for further use. Coked catalyst, after separation from the gaseous cracked product hydrocarbons, falls into a stripping section 34 where steam is injected through a nozzle 35 and distributor to purge any residual hydrocarbon vapor. After the stripping operation, the coked catalyst is fed to the catalyst regenerator 14 through a spent catalyst standpipe 36.

FIG. 1 also depicts a regenerator 14 known as a combustor. But other types of regenerators are suitable. In the catalyst regenerator 14, a stream of oxygen-containing gas, such as air, is introduced through an air distributor 38 to contact the coked catalyst, burn coke deposited thereon, and provide regenerated catalyst and flue gas. A stream of air or other oxygen containing gas is fed into the regenerator 14 through line 37. Catalyst and air flow upwardly together along a combustor riser 40 located within the catalyst regenerator 14 and, after regeneration, are initially separated by discharge through a disengager 42. Finer separation of the regenerated catalyst and flue gas exiting the disengager 42 is achieved using first and second stage separator cyclones 44, 46, respectively, within the catalyst regenerator 14. Catalyst separated from flue gas dispenses through diplegs from cyclones 44, 46 while flue gas significantly lighter in catalyst sequentially exits cyclones 44, 46 and exits the regenerator vessel 14 through flue gas outlet 47 in line 48. Regenerated catalyst is recycled back to the reactor riser 20 through the regenerated catalyst standpipe 18.

As a result of the coke burning, the flue gas vapors exiting at the top of the catalyst regenerator 14 in line 48 contain $CO$, $CO_2$ and $H_2O$, along with smaller amounts of other species.

In the FCC recovery section 50, the gaseous cracked stream in line 32 is fed to a lower section of an FCC main fractionation column 52. The main fractionation column 52 is in downstream communication with the riser 20 and the FCC reactor 12. Several fractions may be fractionated and taken from the main fractionation column 52 including a CSO stream from the bottom in main bottoms line 58, an optional heavy cycle oil (HCO) stream in line 54, an LCO in line 55 and an optional heavy naphtha stream in line 56. In the system depicted in FIG. 1, a heavy cycle oil (HCO) stream in line 54 may only be pumped around to cool the main fractionation column 52 without an HCO product stream being taken. Gasoline and gaseous light hydrocarbons are removed in a main overhead line 57 from the main fractionation column 52 and condensed before entering a main column receiver 59. An aqueous stream is removed from a boot in the receiver 59. Moreover, a condensed unstabilized, light naphtha stream is removed in a main column receiver bottoms line 61 while a gaseous light hydrocarbon stream is removed in overhead line 62. A portion of the light naphtha stream in bottoms line 61 may be refluxed to the main fractionation column 52 while a light unstabilized naphtha stream is withdrawn in line 63. Both streams in lines 62 and 63 may enter a vapor recovery section downstream of the main fractionation column 52. Any or all of lines 54-56 may be cooled and pumped back to the main column 52 to cool the main column typically at a higher location.

Figure 2A:
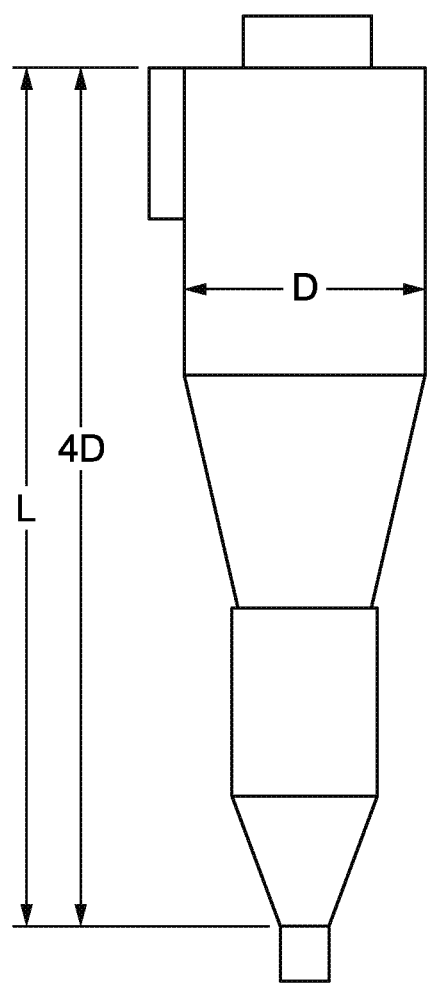
FIG. 2A depicts a cyclone LID ratios in accordance with one or more example embodiments.

The reactor and regenerator typically each comprise one or more cyclones. The cyclones may be identified by their length and a diameter, as seen in FIG. 2A. The cyclone length-to-diameter ratio may be calculated and may be used when assessing features of the cyclones. The cyclone length-to-diameter ratio may be fixed at design, and therefore may be determined from the equipment geometry drawings. As an illustrative example, FIG. 2A shows one example of a cyclone length-to-diameter ratio where L=4D or L/D=4. The diameter is taken at the largest diameter of the cyclone.

Figure 2B:
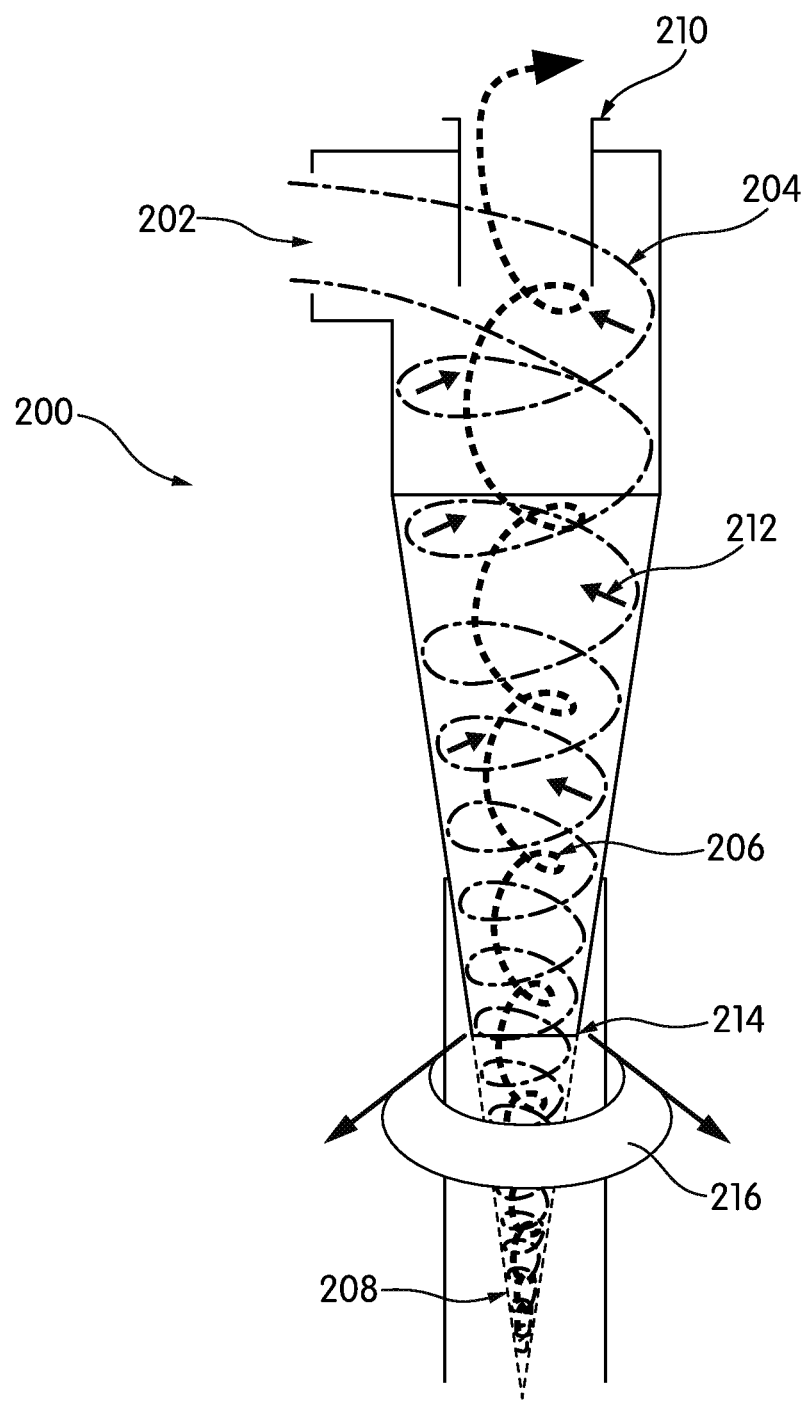
FIG. 2B depicts gas flow in a cyclone in accordance with one or more example embodiments.

FIG. 2B depicts illustrative gas flows in a cyclone 200. In the example shown in FIG. 2B, there are three gas flows in a cyclone. The gases entering inlet 202 spiral down the walls of the cyclone cylinder and cone in a descending gas flow 204. The exiting gases 206 rise up in the center of the cyclone, forming a cone with the apex 208 at the bottom and the base at the entrance to the gas outlet tube 210. Along the interface 212 between these two gas streams, gases flow from the descending stream 204 into the ascending stream (exit stream 206). Thus, while the amount of downward flowing gases is constantly decreasing, the constantly decreasing cone diameter keeps the gas velocity nearly constant. The dust flows outwardly from the bottom of cone 214 as indicated by path 216.

Figure 3A:
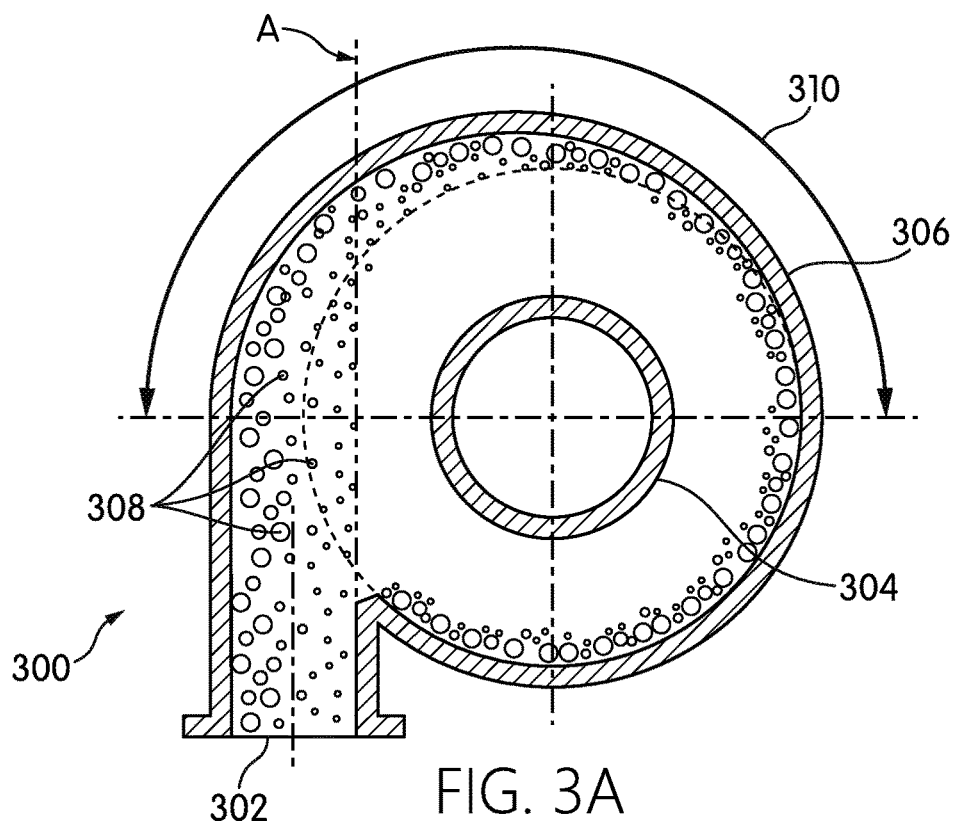
FIG. 3A depicts an inlet scroll in accordance with one or more example embodiments.
Figure 3B:
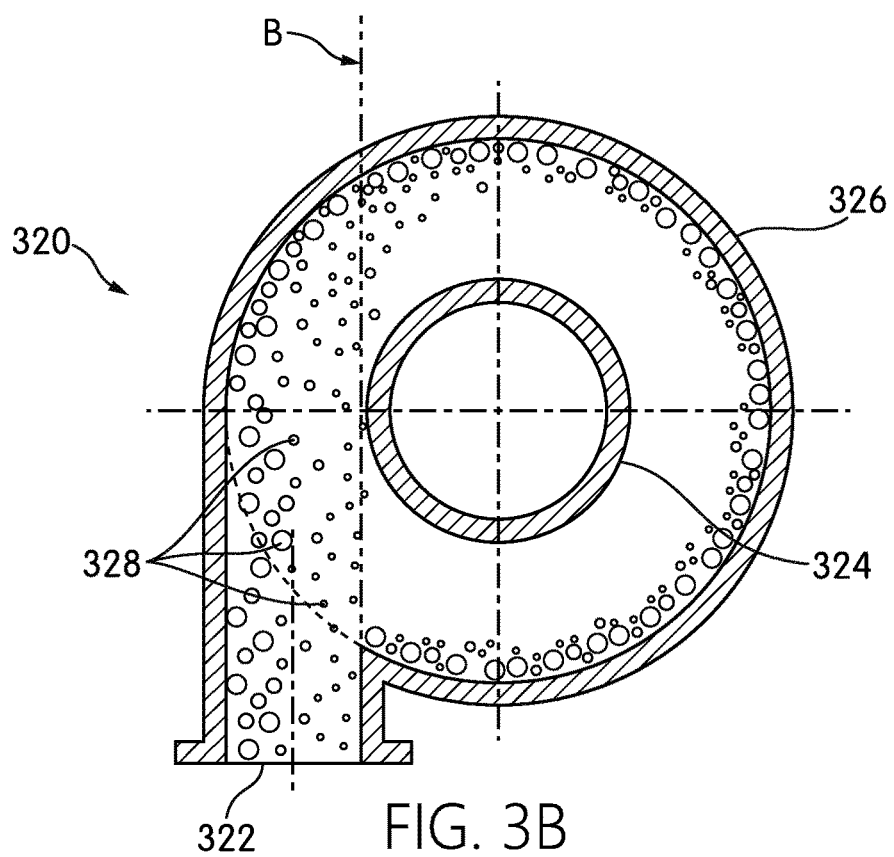
FIG. 3B depicts a tangential inlet in accordance with one or more example embodiments.

In one or more embodiments, it is desirable to have the catalyst particles stay entrained in the descending gas stream and undesirable to have the particles transfer to the exiting gas. One manner of keeping the particles out of the exiting stream may be to use an inlet scroll on the cyclone to force the gas stream entering the inlet to keep the entrained particles away from the entrance to the gas outlet tube. FIG. 3A shows an illustrative example of a gas inlet 302 having a 180 degree scroll 310. Gas enters the top of cyclone 300 through inlet 302. Particles 308 in the inlet gas move toward the outer wall 306 of the cyclone. The scroll 310 is the angular distance over which the outer wall of the inlet 302 completely coincides with the outer wall 306 of the cyclone. In FIG. 3A, the scroll 310 extends an angular distance from the nine o'clock position to the three o'clock position comprising 180 degrees. FIG. 3B shows a comparative example of a top of cyclone 320 having a tangential inlet 322 with no scroll because the outer wall of the inlet 302 completely coincides with the outer wall 306 of the cyclone at the entrance to the cyclone 300 with no gradation. Hence, the scroll is zero degrees. That is the gas enters the top of cyclone 320 through inlet 322. Particles 328 in the inlet gas likewise move toward the outer wall 326 of the cyclone. Due to the extra width of the 180 degree inlet scroll in FIG. 3A, as depicted by line A, the particles are not near the entrance to the gas outlet tube 304 whereas as shown in FIG. 3B, when the cyclone has no inlet scroll, as depicted by line B, the particles are much closer to the entrance of the gas outlet tube 324. In some cyclones, the inlet scroll may also prevent the impingement of entering particles on the gas outlet tube.

Refractory material may applied to the interior of the wall of the cyclone to form an abrasion resistant lining (ARL), which may serve to insulate the walls of the cyclone from the gas flow contents. The ARL may be produced in a standard thickness (e.g., 19 mm, 25 mm). This ARL, after being applied, may erode over time. If holes form in the ARL, the metal walls of the cyclone may be exposed and no longer protected. Holes can then form in these metal walls of the cyclone, resulting in loss of the pressure balance. With a loss of pressure, gases can be sucked into the cyclone affecting the flow and causing particles to swirl to the middle and exit with the gas flow, which may result in undesirable catalyst loss. Such erosion may occur more rapidly in processes using higher cyclone inlet velocities, higher catalyst loadings, and/or higher outlet tube velocities. In some embodiments, it may be difficult to measure erosion of the ARL during operation of the FCC process (e.g., with sensors), and therefore empirical data and predictions may be used to predict the erosion rate and the thickness of the ARL at any given point in a run.

Cyclones may be areas with higher or the most erosion in an FCC process, and may be one of the more difficult areas to assess. Erosion of ARL may be overlooked during planned turnarounds, which may result in subsequent unplanned turnarounds. Furthermore, even if detected during a planned turnaround, the turnaround may be delayed due to unanticipated ARL (refractory) repair in the reactor and/or regenerator resulting in high cost. Therefore, it may be advantageous to enable early detection of ARL erosion so that the ARL can be repaired or replaced during a planned turnaround.

Estimation of Cyclone Life and Methodology

Erosion of the cyclone refractory and base metal may be proportional to the inlet velocity of the feed. Therefore, inlet feed velocity may be a predictive factor for the wear of the cyclones and may play a role in catalyst losses created by holes in the ARL of cyclones. In one or more embodiments, an illustrative recommended inlet feed velocity may be used (e.g., between 55 and 65 feet per second). Using a recommended inlet feed velocity may balance the efficiency of the cyclone with the erosion and wear caused by higher velocities. Some FCCs may be operated with a velocity in a recommended range for both the reactor and regenerator. Some FCCs (e.g., 25% of FCCs) may be operated at higher inlet feed velocities (e.g., between 55 and 75 feet per second) in both the reactor and regenerator. Some FCCs (e.g., a small percentage) may operate at very high inlet feed velocities (e.g., exceeding 75 feet per second). A very high inlet feed velocity may lead to rapid wear of the ARL in cyclones. In some systems, an increase in the rate of inlet feed velocity may cause an increase at a greater rate in the wear of the ARL in the cyclones (e.g., the wear rate increases faster than the feed velocity, such as an exponential increase).

Figure 4:
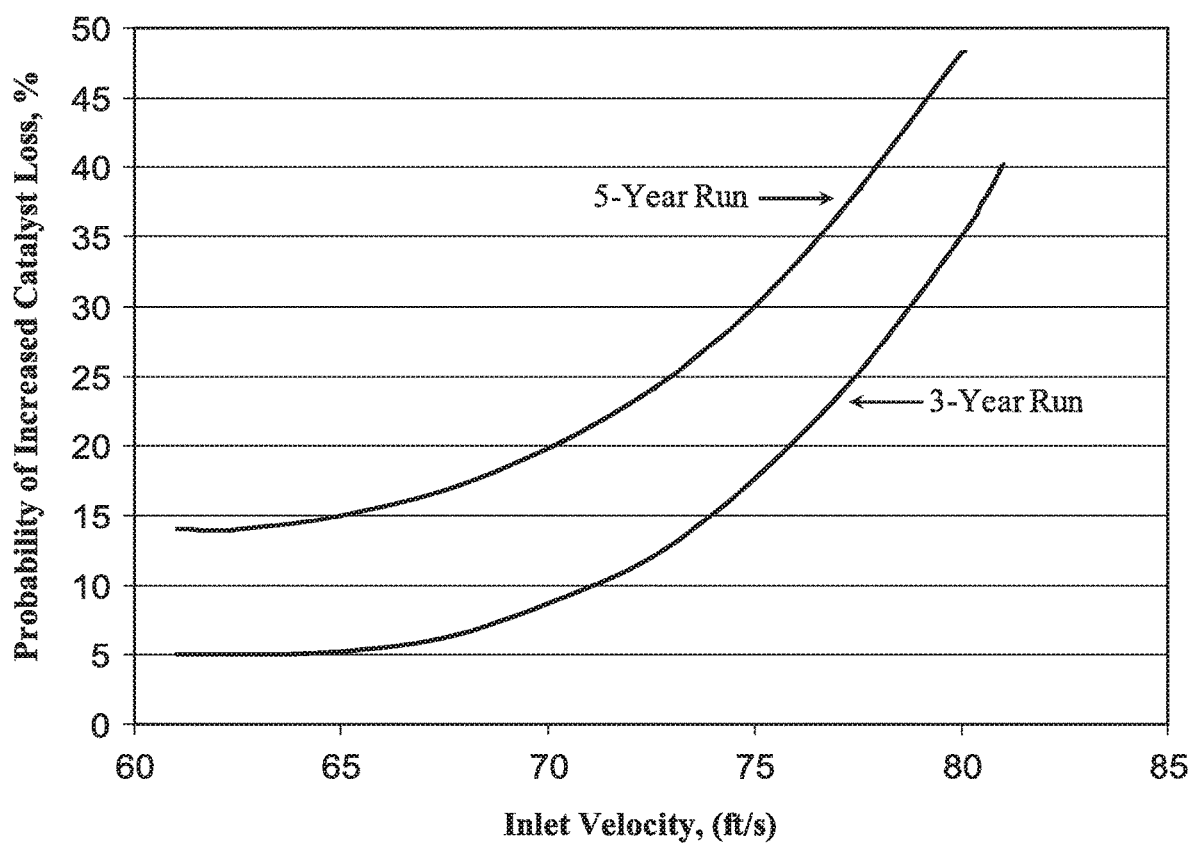
FIG. 4 depicts a graph of estimated cyclone performance in accordance with one or more example embodiments.

FIG. 4 shows an illustrative example where the probability of catalyst loss increases exponentially with inlet feed velocity. Such catalyst loss not only affects the efficiency of the cyclone, but may also reflect the erosion of the ARL. Thus, catalyst loss may indicate problems in the cyclones and cause unplanned turnarounds (shutting down of the equipment for inspection and repair.) Preventing catalyst loss may also be a motivator for thoroughly inspecting the cyclones during turnarounds.

Cyclone life may be proportional to superficial velocity, and may be a function of multiple parameters. In one or more embodiments, cyclone life may be determined using, for example, five parameters: inlet velocity, catalyst loading, catalyst hardness, refractory quality, and/or cyclone design. Refractory quality and cyclone design may be constants and may be received from the supplier or manufacturer. Loading and hardness may be qualities of the catalyst. In current assessments, an average of the daily superficial velocities may be added together over time, and this value may be correlated with visual inspections and thickness measurements. The following equation, for example, may be used to determine erosion rate:

$$\text{Erosion rate} = K\,L\,(PD)^2(Dp)^3 V^n S$$

where K is a constant; S is a shape factor; L is loading; PD is particle density; Dp is particle size; V is the superficial velocity and n is the graded velocity exponent.

In one or more embodiments, the sum of the cube of the average of the daily superficial velocities may be added together over time, as discussed above, and the sum of the average of the daily superficial velocities may be used (as V) in the above equation for determining the erosion rate.

In one or more embodiments, a different method of calculating the rate of erosion may be used to determine the actual erosion rate of the ARL. This method, which is illustratively depicted in FIG. 6, may use an equation based on cyclone inlet feed velocity instead of superficial velocity. Using the calculated erosion rate, the remaining thickness of the ARL may be calculated, which may allow a determination of the remaining cyclone life.

In step 602, the cyclone inlet scroll and the L/D is determined. One illustrative example is depicted in FIG. 3A, indicating a cyclone inlet scroll of 180. In FIG. 2A, an illustrative example depicts an L/D of four.

In step 604, the graded velocity exponent "n" may be graded between 2 and 5 depending on the design aspects of the cyclone. The design aspects include the inlet scroll and the L/D ratio. An average exponent may be calculated from the exponents obtained from aspects (A) and (B). (A) For a cyclone inlet scroll varying between 0-180, the exponent can vary between 2 and 5 with the exponent being generally higher for a lower inlet scroll. As an illustrative example, the cyclone inlet scroll of 180 in FIG. 3A would suggest an exponent of 2. (B) For a cyclone L/D varying between 3 and 5, the exponent can vary between 2 and 5 with the exponent being generally higher for a lower cyclone L/D. As depicted in FIG. 2A, the L/D ratio may be determined based on the dimensions of a cyclone, and then an exponent may be assigned based on this ratio. As an illustrative example in FIG. 2A, L/D is four, so the exponent can be suggested as 3 or 4. Taking 4 as the exponent from substep B and 2 as the exponent from substep A, the average would be 3 providing a graded velocity exponent of 3.

Returning to FIG. 6, in step 606, in order to calculate the erosion rate, measurements of cyclone inlet feed velocity may be taken at selected periods during a first (calibration) run. In some systems, runs may last, for example, three to five years. The selected measurement periods may be any selected period such as, for example, daily, every two, three, four, five, or six days, or weekly, or every eight, nine, ten, eleven, twelve, or thirteen days, or biweekly, etc. for the length of the first run. As an illustrative example for explanation purposes, the selected period may be daily, but it is understood that any selected period may be utilized.

The erosion rate results of the first run may be used to calculate the erosion rate of a second run under the same or different cyclone inlet velocities.

As an example, in one or more embodiments, for the first (calibration) run, the cyclone inlet feed velocity may be measured daily for an entire run of a cyclone (e.g., three to five years).

The following equation may be used to determine the erosivity rate of the ARL in the cyclone for each daily measured cyclone inlet feed velocity.

Erosivity rate=$L \, (PD)^2 (Dp)^3 V^n$ where L (g/m$^3$ or lb/ft$^3$) is the catalyst particle loading in the inlet feed flow; PD is 1.6 times the average bulk density or 1.6 (ABD) of the catalyst; Dp is the average particle size of the catalyst; V is the cyclone inlet feed velocity in ft/sec, and n is the velocity exponent.

Figure 5:
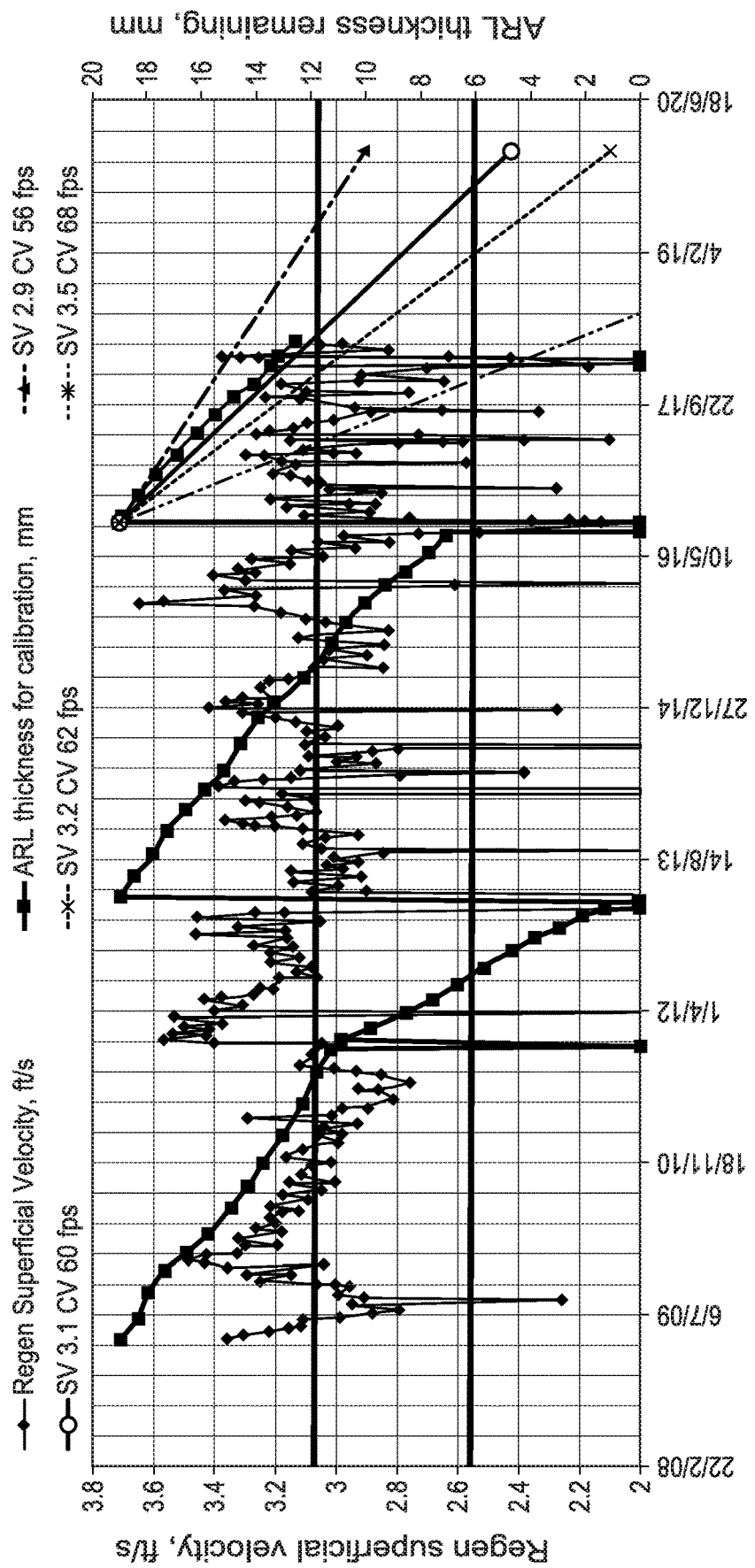
FIG. 5 depicts a the sensitivity of superficial velocity on remaining ARL thickness in accordance with one or more example embodiments.

In step 608, the daily erosivity rate may then be calculated using cyclone inlet feed velocity and the average exponent. In step 610, each daily erosivity rate may be summed up to obtain a cumulative number. This cumulative number may be correlated to the ARL (abrasion resistant lining) thickness in the cyclone at the beginning and the end of the first run. This is depicted in the illustrative example in the Table below, where the column labeled "Calibration" is the first run, as well as in FIG. 5. The middle run from 2013 to 2016 is used for calibrating the velocity exponent, which is then validated using the data from the previous run from 2009 to 2013. The velocity exponent used in the calibration run is validated by approximating the same slope as exhibited in the previous run at least when the similar regenerator superficial velocities are used. The slope of the previous run gets steeper when the regenerator superficial velocities increase in January 2012. Once this velocity exponent is validated, it can then be used to forward predict from 2016 onwards ("ARL thickness for calibration, mm"). Returning to FIG. 6, in step 612, the calculated values may then be used to predict the erosion rate for a second run for a given set of conditions, e.g., different inlet velocities, as demonstrated in the illustrative example in the Table below:

|  | Calibration | Superficial Velocity | Superficial Velocity | Superficial Velocity | Superficial Velocity |
|---|---|---|---|---|---|
| Start of base run, date | 24-Apr-13 | 1-Sep-16 | 1-Sep-16 | 1-Sep-16 | 1-Sep-16 |
| End of base run, predicted date | 1-Aug-16 | 31-Dec-19 | 31-Dec-19 | 31-Dec-19 | 31-Dec-19 |
| ARL thickness after turnaround, mm | 19 | 19 | 19 | 19 | 19 |
| Flue Gas Density, kg/m$^3$ | 1.049 | 1.049 | 1.049 | 1.049 | 1.049 |
| E-cat ABD, g/cc |  | 0.8 | 0.8 | 0.8 | 0.8 |
| Regen Superficial Velocity, ft/s | 2.97 | 2.90 | 3.10 | 3.20 | 3.50 |
| APS, microns | 90.17 | 96 | 96 | 96 | 96 |
| Flue Gas Density, lb/ft$^3$ | 0.065 | 0.065 | 0.065 | 0.065 | 0.065 |
| Regen Superficial Velocity, m/s | 0.91 | 0.88 | 0.95 | 0.98 | 1.07 |
| Regen primary cyclone velocity, m/s | 17.61 | 17.20 | 18.39 | 18.98 | 20.76 |
| FCC catalyst particle density, lb/ft3 from ABD | 87.27 | 81.41 | 81.41 | 81.41 | 81.41 |
| Cyclone Erosion |  |  |  |  |  |
| Sum of erosivity of last run | 1.39E+17 | 9.95E+13 | 1.60E+14 | 2.00E+14 | 3.79E+14 |
| PD, g/cc | 1.40 | 1.30 | 1.30 | 1.30 | 1.30 |
| APS, microns | 90.17 | 96.00 | 96.00 | 96.00 | 96.00 |
| Superficial velocity, ft/s | 2.97 | 2.90 | 3.10 | 3.20 | 3.50 |
| Loading, lb/ft3 | 0.77 | 0.87 | 1.03 | 1.12 | 1.42 |
| Pry cyclone inlet velocity, ft/s | 57.76 | 56.41 | 60.30 | 62.25 | 68.08 |
| Base ARL t loss per erosivity | 1.37058E−16 |  |  |  |  |
| ARL thickness remaining, mm |  | 18.99 | 18.98 | 18.97 | 18.95 |
| ARL thickness loss, mm/day |  | 0.014 | 0.022 | 0.027 | 0.052 |
| last run length, days | 1195.00 | 1216.00 | 1216.00 | 1216.00 | 1216.00 |
| Run length, years | 3.27 | 3.33 | 3.33 | 3.33 | 3.33 |

Although the predictions are prepared based on cyclone inlet feed velocity, the results may be presented in terms of superficial velocity, as indicated in the figures. The straight lines indicating erosion rates plotted on FIG. 5, right side of the graph, may be plotted for each superficial velocity/inlet feed velocity noted above. It can be seen that in one or more embodiments, increasing the feed velocity may increase the erosion rate of the ARL, and that in one or more embodiments, decreasing the feed velocity may decrease the erosion rate of the ARL.

Further measurements may be taken during the second run (e.g., as another calibration run) and may be used to predict the erosion rate for a third run, and so on until the end of life of the cyclone.

With this tool, the estimated remaining ARL thickness can be calculated as an ongoing monitoring variable, which can be used by the refiners to either push their FCC operating envelope (e.g., maximize production) until their next planned turnaround and/or to estimate the anticipated repair scope and plan properly for the turnaround.

This tool may be used to modify conditions to extend ARL life, for example, by changing the pressure of the unit by opening or closing pressure valves (e.g., pressure control slide valves, butterfly valves). For example, a valve may be partially closed (e.g., a valve that is partially opened 60% may be closed to 55%) to increase pressure in the cyclone. In one or more embodiments, this process may be done automatically (e.g., a computer may send a signal causing the valve to close). Other parameters may be changed such as, but not limited to, inlet flow rates, air flow rates, temperature, and catalyst loading. In one or more embodiments, these parameters may be adjusted automatically (e.g., a computer may send a signal causing an adjustment to an inlet flow rate, an air flow rate, a temperature, a catalyst loading rate, or the like).

Determining the erosion rate of the ARL may be used in all fluid bed applications where cyclones are used to contain solids in the bed. For example, other technologies or processes that use cyclones, and in which the erosion rate of the ARL may be determined, may include methanol-to-olefins (MTO) processes and other fluid bed processes. The process for determining the erosion rate of the ARL may be similar to the process for doing so for FCC.

In one or more embodiments, the erosion rate of the ARL may be determined by a computer system that is part of a connected plant. In one or more embodiments, the erosion rate of the ARL may be provided as an output on a graphical user interface, such as on a dashboard.

More particularly, the present disclosure may be used within a computing system environment for a refinery or plant (e.g., that performs a fluid catalytic cracking process), wherein the computing system environment includes, for example, a data collection platform, a data analysis platform, and/or a control platform. Information may be gathered by one or more sensors or measurement devices and transmitted to data collection platform. Data collection platform may transmit the collected data to data analysis platform, which may be at a plant or remote from a plant (e.g., in the cloud). The data analysis platform may send one or more commands or recommendations to a control platform, which may adjust one or more operating parameters of the plant.

Monitoring FCC Processes

Although sensors might not be used to directly assess the thickness of the ARL, sensors may be used throughout the FCC process, as well as to collect data that is used to estimate the thickness of the ARL. Measurements may be taken to determine one or more of the catalyst particle loading in the inlet feed flow, the average bulk density of the catalyst, the average particle size of the catalyst, the cyclone inlet feed velocity, and/or the velocity exponent. In some embodiments, offline measurements may be performed periodically (e.g., daily, one or twice a week, weekly, monthly, or some other interval).

Suitable sensors may include pressure sensors, temperature sensors, flow sensors for feed and product streams, chemical composition analyzers, moisture sensors/analyzers, infrared cameras, tunable laser diodes, chemical sensors/analyzers, gas valve position sensors, gas flow rate sensors, flue gas analyzers, and/or liquid level sensors. Infrared cameras mounted outside of equipment can continually take temperature measurements along different locations and monitor temperature gradients. Sensors may be used to detect equipment that is malfunctioning or clogged such as valves, orifices, heaters, and coolers. Flow meters may be used to detect flow velocity and quantity of gas, liquid, and solid streams. Measurements devices may be used to determine reactant consumption, product yield, product quality, and throughput.

Figure 7A:
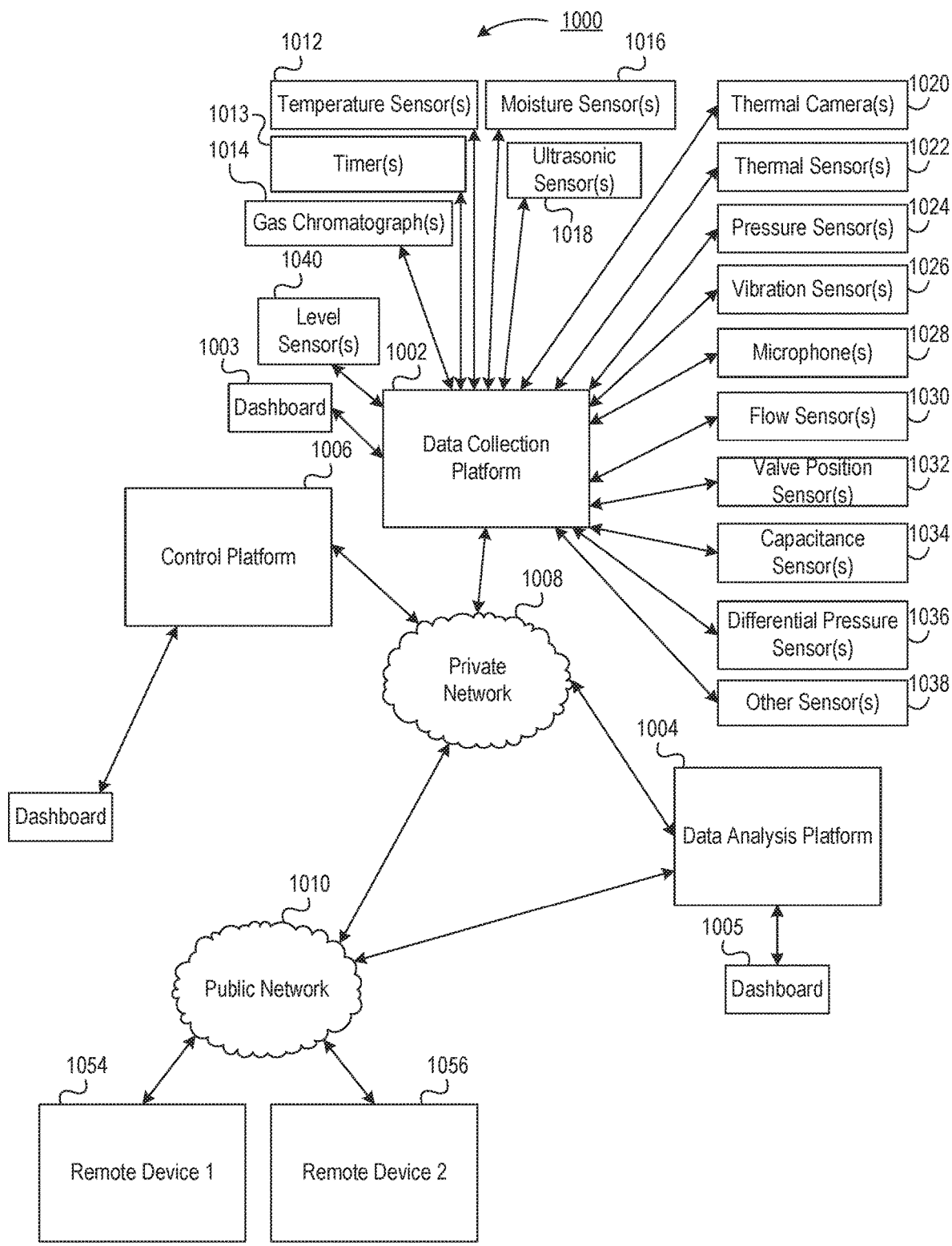
FIG. 7A depicts an illustrative computing environment for managing the operation of one or more pieces of equipment in a plant in accordance with one or more example embodiments.

The system may include one or more computing devices or platforms for collecting, storing, processing, and analyzing data from one or more sensors. FIG. 7A depicts an illustrative computing system that may be implemented at one or more components, pieces of equipment, and/or plants. FIG. 7A-FIG. 7E (hereinafter collectively "FIG. 7"), show, by way of illustration, various components of the illustrative computing system in which aspects of the disclosure may be practiced. It is to be understood that other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or combination thereof, and that the specification is not intended to be limiting in this respect.

FIG. 7A depicts an illustrative operating environment in which various aspects of the present disclosure may be implemented in accordance with example embodiments. The computing system environment 1000 illustrated in FIG. 7A is only one example of a suitable computing environment and is not intended to suggest any limitation as to the scope of use or functionality contained in the disclosure. The computing system environment 1000 may include various sensor, measurement, and data capture systems, a data collection platform 1002, a data analysis platform 1004, a control platform 1006, one or more networks, one or more remote devices 1054, 1056, and/or one or more other elements. The numerous elements of the computing system environment of FIG. 7A may be communicatively coupled through one or more networks. For example, the numerous platforms, devices, sensors, and/or components of the computing system environment may be communicatively coupled through a private network 1008. The sensors be positioned on various components in the plant and may communicate wirelessly or wired with one or more platforms illustrated in FIG. 7A. The private network 1008 may include, in some examples, a network firewall device to prevent unauthorized access to the data and devices on the private network 1008. Alternatively or additionally, the private network 1008 may be isolated from external access through physical means, such as a hard-wired network with no external, direct access point. The data communicated on the private network 1008 may be optionally encrypted for further security. Depending on the frequency of collection and transmission of sensor measurements and other data to the data collection platform 1002, the private network 1008 may experience large bandwidth usage and be technologically designed and arranged to accommodate for such technological issues. Moreover, the computing system environment 1000 may also include a public network 1010 that may be accessible to remote devices (e.g., remote device 1054, remote device 1056). In some examples, a remote device may be located not in the proximity (e.g., more than one mile away) of the various sensor, measurement, and data capture systems illustrated in FIG. 7A. In other examples, the remote device may be physically located inside a plant, but restricted from access to the private network 1008; in other words, the adjective "remote," need not necessarily require the device to be located at a great distance from the sensor systems and other components.

Although the computing system environment of FIG. 7A illustrates logical block diagrams of numerous platforms and devices, the disclosure is not so limited. In particular, one or more of the logical boxes in FIG. 6 may be combined into a single logical box or the functionality performed by a single logical box may be divided across multiple existing or new logical boxes. For example, aspects of the functionality performed by the data collection platform 1002 may be incorporated into one or each of the sensor devices illustrated in FIG. 7A. As such, the data collection may occur local to the sensor device, and the enhanced sensor system may communicate directly with one or more of the control platform 1006 and/or data analysis platform 1004. Such an embodiment is contemplated by FIG. 7A. Moreover, in such an embodiment, the enhanced sensor system may measure values common to a sensor, but may also filter the measurements such just those values that are statistically relevant or of-interest to the computing system environment are transmitted by the enhanced sensor system. As a result, the enhanced sensor system may include a processor (or other circuitry that enables execution of computer instructions) and a memory to store those instructions and/or filtered data values. The processor may be embodied as an application-specific integrated circuit (ASIC), FPGA, or other hardware- or software-based module for execution of instructions. In another example, one or more sensors illustrated in FIG. 7A may be combined into an enhanced, multi-purpose sensor system. Such a combined sensor system may provide economies of scale with respect to hardware components such as processors, memories, communication interfaces, and others.

In yet another example, the data collection platform 1002 and data analysis platform 1004 may reside on a single server computer and depicted as a single, combined logical box on a system diagram. Moreover, a data store may be illustrated in FIG. 7A separate and apart from the data collection platform 1002 and data analysis platform 1004 to store a large amount of values collected from sensors and other components. The data store may be embodied in a database format and may be made accessible to the public network 1010; meanwhile, the control platform 1006, data collection platform 1002, and data analysis platform 1004 may be restricted to the private network 1008 and left inaccessible to the public network 1010. As such, the data collected from a plant may be shared with users (e.g., engineers, data scientists, others), a company's employees, and even third parties (e.g., subscribers to the company's data feed) without compromising potential security requirements related to operation of a plant. The data store may be accessible to one or more users and/or remote devices over the public network 1010.

Referring to FIG. 7A, process measurements from various sensor and monitoring devices may be used to monitor conditions in, around, and on process equipment. Such sensors may include, but are not limited to, pressure sensors 1024, differential pressure sensors 1036, thermal sensors 1022, other flow sensors 1030, temperature sensors 1012 including thermal cameras 1020, capacitance sensors 1034, valve position sensors 1032, gas chromatographs 1014, moisture sensors 1016, ultrasonic sensors 1018, microphones 1028, timers 1013, vibration sensors 1026, level sensors 1040, and other sensors 1038 used in the refining and petrochemical industry. Further, process laboratory measurements may be taken using gas chromatographs 1014, liquid chromatographs, distillation measurements, octane measurements, and other laboratory measurements.

Sensor data, process measurements, and/or calculations made using the sensor data or process measurements may be used to monitor and/or improve the performance of the equipment and parts making up the equipment, as discussed in further detail below. For example, sensor data may be used to detect that a desirable or an undesirable chemical reaction is taking place within a particular piece of equipment, and one or more actions may be taken to encourage or inhibit the chemical reaction. Chemical sensors may be used to detect the presence of one or more chemicals, such as corrosive species, oxygen, hydrogen, and/or water (moisture). In another example, equipment information, such as wear, efficiency, production, state, or other condition information, may be gathered and determined based on sensor data. Corrective action may be taken based on determining this equipment information. For example, if the equipment is showing signs of wear or failure, corrective actions may be taken, such as taking an inventory of parts to ensure replacement parts are available, ordering replacement parts, and/or calling in repair personnel to the site. Certain parts of equipment may be replaced immediately. Other parts may be safe to use, but a monitoring schedule may be adjusted. Alternatively or additionally, one or more inputs or controls relating to a process may be adjusted as part of the corrective action. These and other details about the equipment, sensors, processing of sensor data, and actions taken based on sensor data are described in further detail below.

Process changes or operating conditions may be able to be altered to preserve the equipment until the next scheduled maintenance period.

Sensor data may be collected by a data collection platform 1002. The sensors may interface with the data collection platform 1002 via wired or wireless transmissions. The data collection platform 1002 may continuously or periodically (e.g., every second, every minute, every hour, every day, once a week, once a month, etc.) transmit collected sensor data to a data analysis platform 1004, which may be nearby or remote from the data collection platform 1002.

Sensor data (e.g., temperature data) may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different spots at different intervals.

Figure 6:
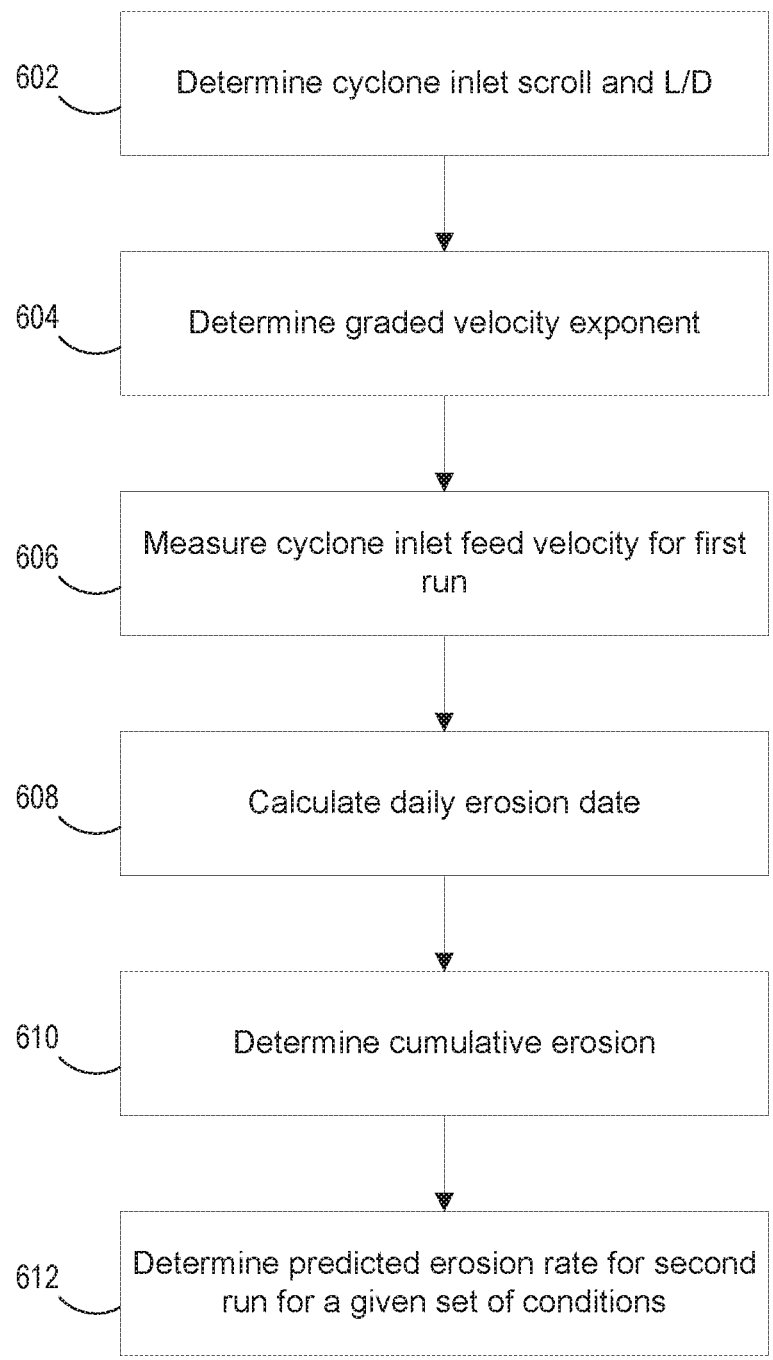
FIG. 6 depicts an illustrative method for determining a predicted erosion rate, in accordance with one or more example embodiments.
Figure 7B:
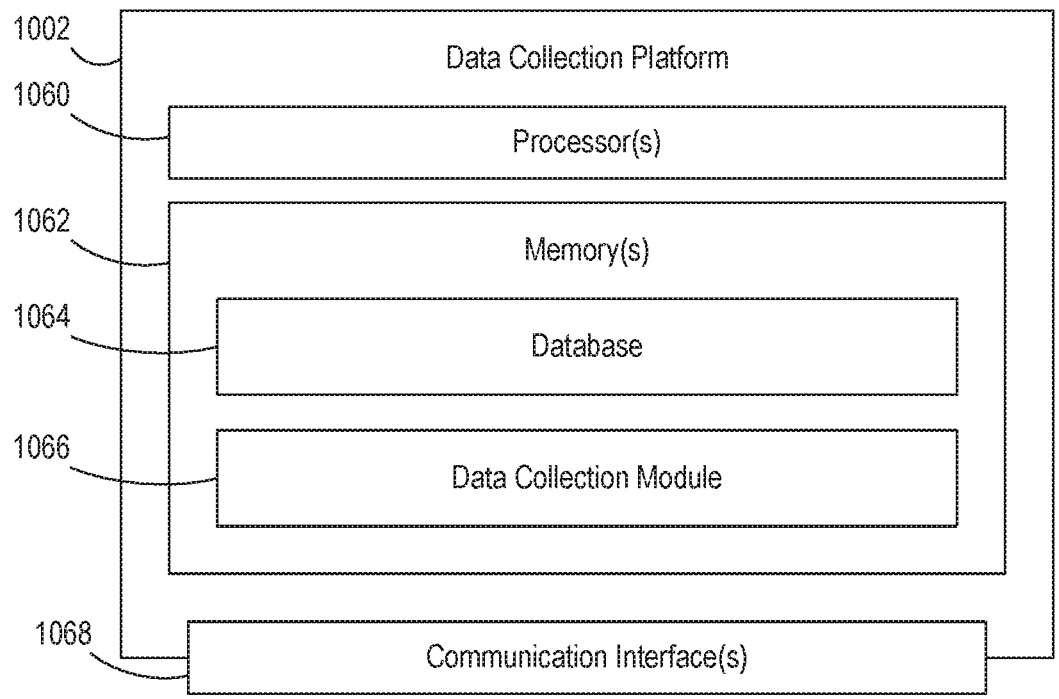
FIG. 7B depicts an illustrative data collection computing platform for collecting data related to the operation of one or more pieces of equipment in a plant in accordance with one or more example embodiments.
Figure 7C:
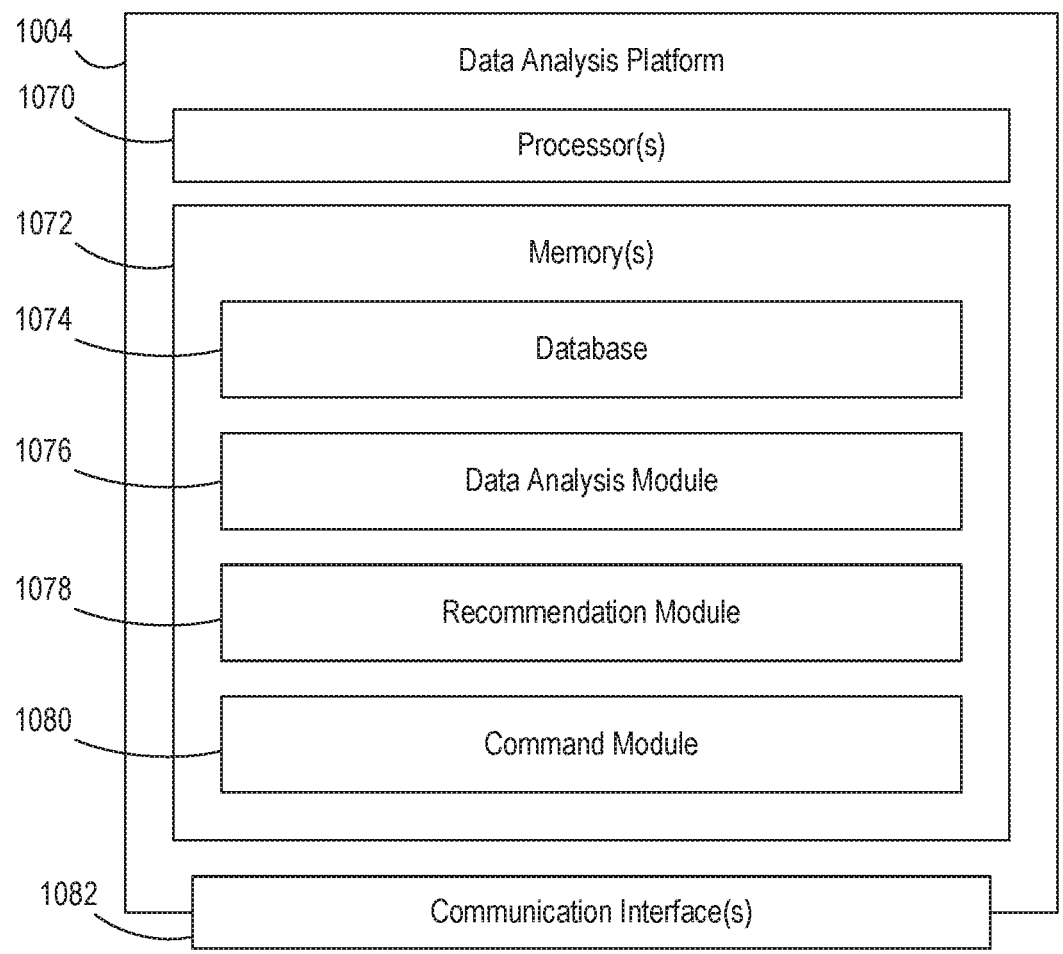
FIG. 7C depicts an illustrative data analysis computing platform for analyzing data related to the operation of one or more pieces of equipment in a plant in accordance with one or more example embodiments.
Figure 7D:
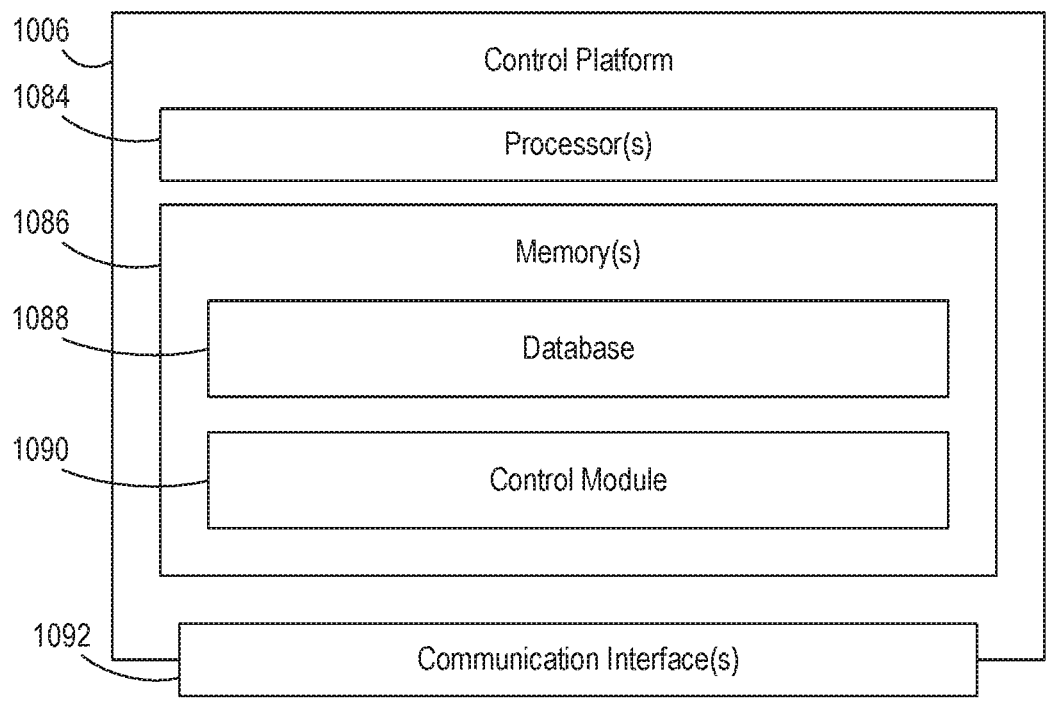
FIG. 7D depicts an illustrative control computing platform for analyzing data related to the operation of one or more pieces of equipment in a plant in accordance with one or more example embodiments.
Figure 7E:
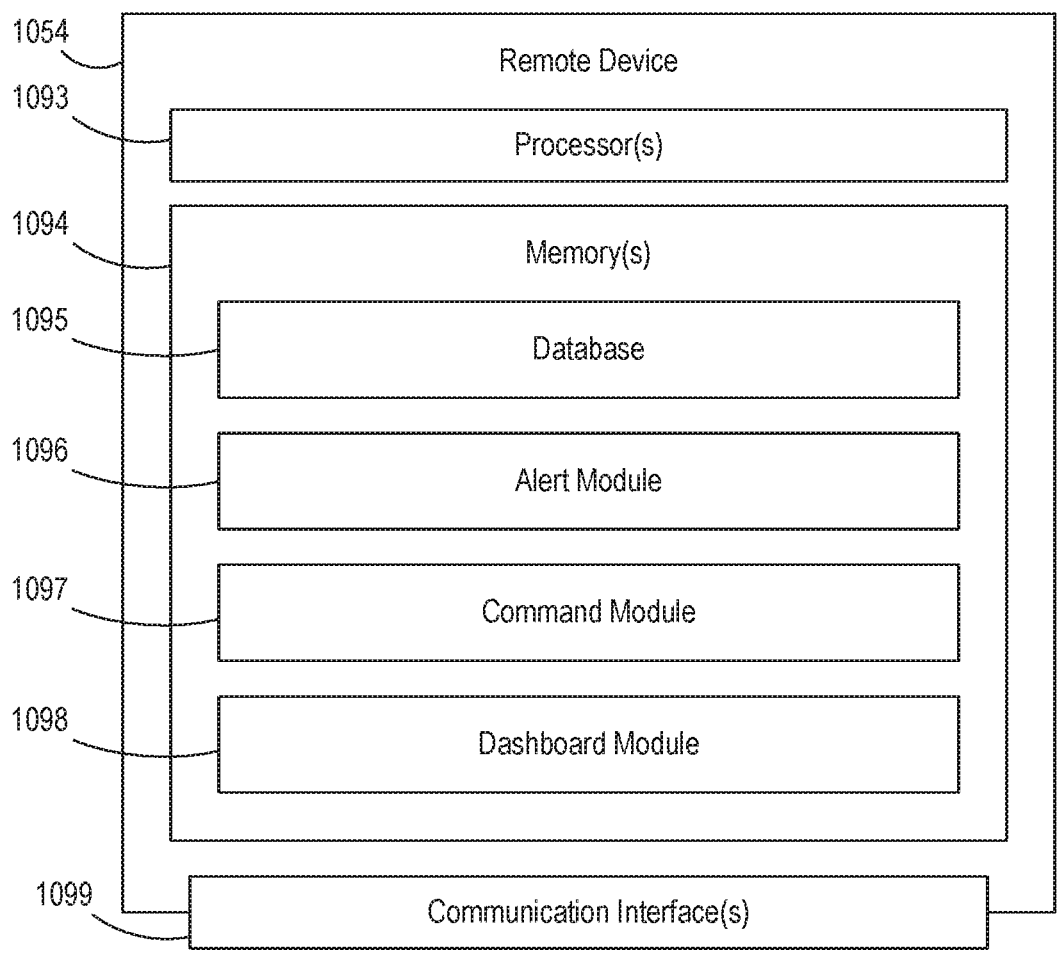
FIG. 7E depicts an illustrative remote computing device for controlling one or more parts of one or more pieces of equipment in a plant in accordance with one or more example embodiments.

The computing system environment of FIG. 7A includes logical block diagrams of numerous platforms and devices that are further elaborated upon in FIG. 7B, FIG. 7C, FIG. 7D, and FIG. 7E. FIG. 7B is an illustrative data collection platform 1002. FIG. 7C is an illustrative data analysis platform 1004. FIG. 7D is an illustrative control platform 1006. FIG. 7E is an illustrative remote device 1054. These platforms and devices of FIG. 6 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, programmable consumer electronics, network PCs, minicomputers, mainframe computers, distributed computing environments that include any of the above systems or devices, and the like.

In addition, the platform and/or devices in FIG. 6 may include one or more memories include any of a variety of computer readable media. Computer readable media may be any available media that may be accessed by the data collection platform 1002, may be non-transitory, and may include volatile and nonvolatile, removable and non-removable media implemented in any method or technology for storage of information such as computer-readable instructions, object code, data structures, database records, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by the data collection platform 1002. The memories in the platform and/or devices may further store modules that may include compiled software code that causes the platform, device, and/or overall system to operate in a technologically improved manner as disclosed herein. For example, the memories may store software used by a computing platform, such as operating system, application programs, and/or associated database.

Furthermore, the platform and/or devices in FIG. 6 may include one or more communication interfaces including, but are not limited to, a microphone, keypad, touch screen, and/or stylus through which a user of a computer (e.g., a remote device) may provide input, and may also include a speaker for providing audio output and a video display device for providing textual, audiovisual and/or graphical output. The communication interfaces may include a network controller for electronically communicating (e.g., wirelessly or wired) over a public network 1010 or private network 1008 with one or more other components on the network. The network controller may include electronic hardware for communicating over network protocols, including TCP/IP, UDP, Ethernet, and other protocols.

In some examples, one or more sensor devices in FIG. 7A may be enhanced by incorporating functionality that may otherwise be found in a data collection platform 1002. These enhanced sensor system may provide further filtering of the measurements and readings collected from their sensor devices. For example, with some of the enhanced sensor systems in the operating environment illustrated in FIG. 7A, an increased amount of processing may occur at the sensor so as to reduce the amount of data needing to be transferred over a private network 1008 in real-time to a computing platform. The enhanced sensor system may filter at the sensor itself the measured/collected/captured data and only particular, filtered data may be transmitted to the data collection platform 1002 for storage and/or analysis.

Referring to FIG. 7B, in one example, a data collection platform 1002 may include one or more processors 1060, one or more memories 1062, and communication interfaces 1068. The memory 1062 may include a database 1064 for storing data records of various values collected from one or more sources. In addition, a data collection module 1066 may be stored in the memory 1062 and assist the processor 1060 in the data collection platform 1002 in communicating with, via the communications interface 1068, one or more sensor, measurement, and data capture systems, and processing the data received from these sources. In some embodiments, the data collection module 1066 may include computer-executable instructions that, when executed by the processor 1060, cause the data collection platform 1002 to perform one or more of the steps disclosed herein. In other embodiments, the data collection module 1066 may be a hybrid of software-based and/or hardware-based instructions to perform one or more of the steps disclosed herein. In some examples, the data collection module 1066 may assist an enhanced sensor system with further filtering the measurements and readings collected from the sensor devices. Although the elements of FIG. 7B are illustrated as logical block diagrams, the disclosure is not so limited. In particular, one or more of the logical boxes in FIG. 7B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 1064 in FIG. 7B is illustrated as being stored inside one or more memories 1062 in the data collection platform 1002, FIG. 7B contemplates that the database 1064 may be stored in a standalone data store communicatively coupled to the data collection module 1066 and processor 1060 of the data collection platform 1002 via the communications interface 1068 of the data collection platform 1002.

In addition, the data collection module 1066 may assist the processor 1060 in the data collection platform 1002 in communicating with, via the communications interface 1068, and processing data received from other sources, such as data feeds from third-party servers and manual entry at the field site from a dashboard graphical user interface. For example, a third-party server may provide contemporaneous weather data to the data collection module. Some elements of chemical and petrochemical/refinery plants may be exposed to the outside and thus may be exposed to various environmental stresses. Such stresses may be weather related such as temperature extremes (hot and cold), high wind conditions, and precipitation conditions such as snow, ice, and rain. Other environmental conditions may be pollution particulates such as dust and pollen, or salt if located near an ocean, for example. Such stresses can affect the performance and lifetime of equipment in the plants. Different locations may have different environmental stresses. For example, a refinery in Texas will have different stresses than a chemical plant in Montana. In another example, data manually entered from a dashboard graphical user interface (or other means) may be collected and saved into memory by the data collection module. Production rates may be entered and saved in memory. Tracking production rates may indicate issues with flows. For example, as fouling occurs, the production rate may fall if a specific outlet temperature can no longer be achieved at the targeted capacity and capacity has to be reduced to maintain the targeted outlet temperature.

Referring to FIG. 7C, in one example, a data analysis platform 1004 may include one or more processors 1070, one or more memories 1072, and communication interfaces 1082. The memory 1072 may include a database 1074 for storing data records of various values collected from one or more sources. Alternatively or additionally, the database 1074 may be the same database as that depicted in FIG. 7B and the data analysis platform 1004 may communicatively couple with the database 1074 via the communication interface of the data analysis platform 1004. At least one advantage of sharing a database between the two platforms is the reduced memory requirements due to not duplicating of the same or similar data. In addition, a data analysis module 1076 may be stored in the memory 1072 and assist the processor 1070 in the data analysis platform 1004 in processing and analyzing the data values stored in the database 1074. In some embodiments, the data analysis module 1076 may include computer-executable instructions that, when executed by the processor 1070, cause the data analysis platform 1004 to perform one or more of the steps disclosed herein. In other embodiments, the data analysis module 1076 may be a hybrid of software-based and/or hardware-based instructions to perform one or more of the steps disclosed herein. In some embodiments, the data analysis module 1076 may perform statistical analysis, predictive analytics, and/or machine learning on the data values in the database 1074 to generate predictions and models. For example, the data analysis module may determine the erosion rate of the ARL. The data analysis platform 1004 may compare erosion data from different dates to determine if changes are occurring. Such comparisons may be made on a monthly, weekly, daily, hourly, real-time, or some other basis.

Referring to FIG. 7C, the recommendation module 1078 in the data analysis platform 1004 may coordinate with the data analysis module 1076 to generate recommendations for adjusting one or more parameters for the operation of the plant environment depicted in FIG. 7A. Such recommendations may be made, for example, based on the erosion rate of the ARL. In some embodiments, the recommendation module 1078 may communicate the recommendation to the command module 1080, which may generate command codes that may be transmitted, via the communications interface, to cause adjustments or halting/starting of one or more operations in the plant environment. For example, commands may be sent that cause the system to automatically partially or fully open or close one or more valves, increase or decrease one or more flow rates, one or more pressures, one or more temperatures, or the like. The command codes may be transmitted to a control platform 1006 for processing and/or execution. In one or more embodiments, the command codes may be directly communicated, either wirelessly or in a wired fashion, to physical components at the plant such that the physical components include an interface to receive the commands and execute on them. Although the elements of FIG. 7C are illustrated as logical block diagrams, the disclosure is not so limited. In particular, one or more of the logical boxes in FIG. 7C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 7C as being stored inside one or more memories in the data analysis platform 1004, FIG. 7C contemplates that the database may be stored in a standalone data store communicatively coupled to the data analysis module and processor of the data analysis platform 1004 via the communications interface of the data analysis platform 1004. Furthermore, the databases from multiple plant locations may be shared and holistically analyzed to identify one or more trends and/or patterns in the operation and behavior of the plant and/or plant equipment. In such a crowdsourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations and prediction models.

Referring to FIG. 7D, in one example, a control platform 1006 may include one or more processors 1084, one or more memories 1086, and communication interfaces 1092. The memory 1086 may include a database 1088 for storing data records of various values transmitted from a user interface, computing device, or other platform. The values may include parameter values for particular equipment at the plant. For example, some illustrative equipment at the plant that may be configured and/or controlled by the control platform 1006 include, but is not limited to, a feed switcher, sprayer, one or more valves, one or more pumps, one or more gates, and/or one or more drains. In addition, a control module 1090 may be stored in the memory and assist the processor in the control platform 1006 in receiving, storing, and transmitting the data values stored in the database. In some embodiments, the control module 1090 may include computer-executable instructions that, when executed by the processor 1084, cause the control platform 1006 to perform one or more of the steps disclosed herein. In other embodiments, the control module may be a hybrid of software-based and/or hardware-based instructions to perform one or more of the steps disclosed herein.

In a plant environment such as illustrated in FIG. 7A, if sensor data is outside of a safe range, this may be cause for immediate danger. As such, there is a real-time component to the system such that the system processes and responds in a timely manner. Although in some embodiments, data could be collected and leisurely analyzed over a lengthy period of months, numerous embodiments contemplate a real-time or near real-time responsiveness in analyzing and generating alerts, such as those generated by the alert module in FIG. 7E.

Referring to FIG. 7E, in one example, a remote device 1054 may include one or more processors 1093, one or more memories 1094, and communication interfaces 1099. The memory 1094 may include a database 1095 for storing data records of various values entered by a user or received through the communications interface. In addition, an alert module 1096, command module 1097, and/or dashboard module 1098 may be stored in the memory 1094 and assist the processor 1093 in the remote device 1054 in processing and analyzing the data values stored in the database. In some embodiments, the aforementioned modules may include computer-executable instructions that, when executed by the processor, cause the remote device 1054 to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through the communications interface. The values may indicate a dangerous condition or even merely a warning condition due to odd sensor readings. The command module 1097 in the remote device 1054 may generate a command that when transmitted through the communications interface to the platforms at the plant, causes adjusting of one or more parameter operations of the plant environment depicted in FIG. 7A. In some embodiments, the dashboard module 1098 may display a graphical user interface to a user of the remote device 1054 to enable the user to enter desired parameters and/or commands. These parameters/commands may be transmitted to the command module 1097 to generate the appropriate resulting command codes that may be then transmitted, via the communications interface, to cause adjustments or halting/starting of one or more operations in the plant environment. The command codes may be transmitted to a control platform 1006 for processing and/or execution. In one or more embodiments, the command codes may be directly communicated, either wirelessly or in a wired fashion, to physical components at the plant such that the physical components include an interface to receive the commands and execute on them.

Although FIG. 7E is not so limited, in some embodiments the remote device 1054 may include a desktop computer, a smartphone, a wireless device, a tablet computer, a laptop computer, and/or the like. The remote device 1054 may be physically located locally or remotely, and may be connected by one of communications links to the public network 1010 that is linked via a communications link to the private network 1008. The network used to connect the remote device 1054 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network 1008 (VPN), or any combination of any of the same. Communications links may be any communications links suitable for communicating between workstations and server, such as network links, dial-up links, wireless links, hard-wired links, as well as network types developed in the future, and the like. Various protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

Although the elements of FIG. 7E are illustrated as logical block diagrams, the disclosure is not so limited. In particular, one or more of the logical boxes in FIG. 7E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 7E as being stored inside one or more memories in the remote device 1054, FIG. 7E contemplates that the database may be stored in a standalone data store communicatively coupled, via the communications interface, to the modules stored at the remote device 1054 and processor of the remote device 1054.

Referring to FIG. 6, in some examples, the performance of operation in a plant may be improved by using a cloud computing infrastructure and associated methods, as described in US Patent Application Publication No. US2016/0260041, which was published Sep. 8, 2016, and which is herein incorporated by reference in its entirety. The methods may include, in some examples, obtaining plant operation information from the plant and/or generating a plant process model using the plant operation information. The method may include receiving plant operation information over the Internet, or other computer network (including those described herein) and automatically generating a plant process model using the plant operation information. These plant process models may be configured and used to monitor, predict, and/or optimize performance of individual process units, operating blocks and/or complete processing systems. Routine and frequent analysis of predicted versus actual performance may further allow early identification of operational discrepancies, which may be acted upon to optimize impact.

The aforementioned cloud computing infrastructure may use a data collection platform 1002 associated with a plant to capture data, e.g., sensor measurements, which may be automatically sent to the cloud infrastructure, which may be remotely located, where it may be reviewed to, for example, eliminate errors and biases, and used to calculate and report performance results. The data collection platform 1002 may include an optimization unit that acquires data from a customer site, other site, and/or plant (e.g., sensors and other data collectors at a plant) on a recurring basis. For cleansing, the data may be analyzed for completeness and corrected for gross errors by the optimization unit. The data may also be corrected for measurement issues (e.g., an accuracy problem for establishing a simulation steady state) and overall mass balance closure to generate a duplicate set of reconciled plant data. The corrected data may be used as an input to a simulation process, in which the process model is tuned to ensure that the simulation process matches the reconciled plant data. An output of the reconciled plant data may be used to generate predicted data using a collection of virtual process model objects as a unit of process design.

The performance of the plant and/or individual process units of the plant is/are compared to the performance predicted by one or more process models to identify any operating differences or gaps. Furthermore, the process models and collected data (e.g., plant operation information) may be used to run optimization routines that converge on an optimal plant operation for a given values of, e.g., feed, products, and/or prices. A routine may be understood to refer to a sequence of computer programs or instructions for performing a particular task.

The data analysis platform 1004 may include an analysis unit that determines operating status, based on at least one of a kinetic model, a parametric model, an analytical tool, and a related knowledge and best practice standard. The analysis unit may receive historical and/or current performance data from one or a plurality of plants to proactively predict future actions to be performed. To predict various limits of a particular process and stay within the acceptable range of limits, the analysis unit may determine target operational parameters of a final product based on actual current and/or historical operational parameters. This evaluation by the analysis unit may be used to proactively predict future actions to be performed. In another example, the analysis unit may establish a boundary or threshold of an operating parameter of the plant based on at least one of an existing limit and an operation condition. In yet another example, the analysis unit may establish a relationship between at least two operational parameters related to a specific process for the operation of the plant. Finally in yet another example, one or more of the aforementioned examples may be performed with or without a combination of the other examples.

The plant process model predicts plant performance that is expected based upon the plant operation information. The plant process model results can be used to monitor the health of the plant and to determine whether any upset or poor measurement occurred. The plant process model is desirably generated by an iterative process that models at various plant constraints to determine the desired plant process model.

Using a web-based system for implementing the method of this disclosure provides many benefits, such as improved plant economic performance due to an increased ability by plant operators to identify and capture economic opportunities, a sustained ability to bridge plant performance gaps, and an increased ability to leverage personnel expertise and improve training and development. Some of the methods disclosed herein allow for automated daily evaluation of process performance, thereby increasing the frequency of performance review with less time and effort required from plant operations staff.

Further, the analytics unit may be partially or fully automated. In one embodiment, the system is performed by a computer system, such as a third-party computer system, remote from the plant and/or the plant planning center. The system may receive signals and parameters via the communication network, and displays in real time related performance information on an interactive display device accessible to an operator or user. The web-based platform allows all users to work with the same information, thereby creating a collaborative environment for sharing best practices or for troubleshooting. The method further provides more accurate prediction and optimization results due to fully configured models. Routine automated evaluation of plant planning and operation models allows timely plant model tuning to reduce or eliminate gaps between plant models and the actual plant performance. Implementing the aforementioned methods using the web-based platform also allows for monitoring and updating multiple sites, thereby better enabling facility planners to propose realistic optimal targets.

Detecting Erosion of ARL and Adjusting Plant Operation

FIG. 8 depicts an illustrative system flow diagram of a process by which a system may predict an erosion rate of ARL of a cyclone in a reactor or regenerator, and may adjust one or more operating parameters based on the predicted erosion rate. For example, adjusting the one or more operating parameters may be to reduce the rate of erosion (e.g., to ensure that the plan is able to continue operating until the next planned turnaround). Alternatively, adjusting the one or more operating parameters may be to maximize plant output before a next turnaround, based on aligning the predicted ARL end-of-life with the next turnaround by using the predicted ARL erosion rate. For example, the plant might increase plant output because the predicted erosion rate would otherwise be low enough that the ARL would not be eroded enough to warrant replacement at the next turnaround.

In step 801, the data collection platform may collect plant operation data, such as air flow rates, flue gas composition, and/or other operation data, which can be used to calculate the cyclone inlet feed velocity. The data collection platform may receive plant operation data from one or more sensors. In step 802, data collection platform may transmit the collected sensor data to data analysis platform, which may be at a plant or remote from a plant (e.g., in the cloud).

In step 803, data analysis platform may perform one or more calculations to determine an ARL erosion rate. One illustrative example of a process that data analysis platform may follow for determining the ARL erosion rate is depicted in FIG. 6, as discussed above.

Figure 9:
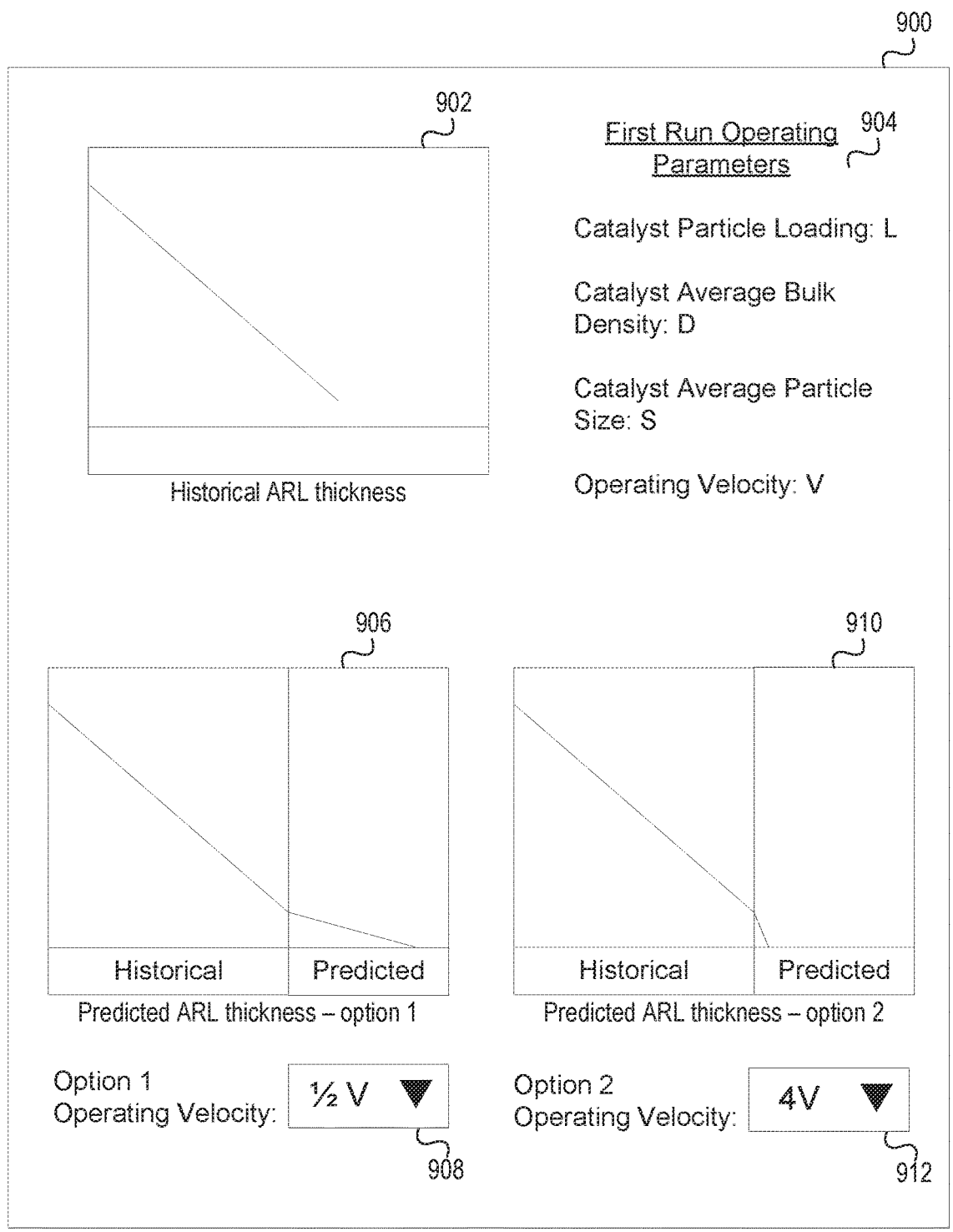
FIG. 9 depicts an illustrative graphical user interface that includes a historical erosion rate and a predicted erosion rate, in accordance with one or more example embodiments.

Returning to FIG. 8, in step 804, a dashboard may be updated to include a display of the ARL erosion rate. An illustrative example of a dashboard that may include the ARL erosion rate is depicted in FIG. 9. As shown in FIG. 9, dashboard 900 may include a depiction (e.g., graph 902) of a historical ARL thickness (e.g., during a first run). Dashboard 900 may include a depiction (e.g., element 904) of one or more operating parameters that the plant or process used for the time period during which the historical ARL thickness was measured. In some embodiments, these operating parameters may vary over the course of the historical time period, and the display of these operating parameters may be adjusted based on a selected portion of the historical ARL thickness. For example, if the user hovers a mouse cursor over a particular spot on the graph 902 of the historical ARL thickness, the element 904 may update the displayed operating parameters to correspond to the operating parameters of the plant at the time of the hovered-over historical ARL thickness. Thus, a user of dashboard 900 may observe the impact of various historical operating parameters on the historical ARL thickness.

Dashboard 900 may include one or more graphs (e.g., graph 906, graph 910) that depict a predicted future ARL thickness. The one or more graphs may display a predicted ARL thickness over time based on particular operating conditions. Dashboard 900 may be interactive (e.g., allow a user to input various different future operating parameters). For example, as shown in FIG. 9, a first operating velocity may be input using input element 908, and the corresponding predicted ARL thickness may be depicted in graph 906. As shown in FIG. 9, a second operating velocity may be input using input element 912, and the corresponding predicted ARL thickness may be depicted in graph 910. Thus, a user of dashboard 900 may observe the impact that various future operating parameters may have on predicted future ARL thickness.

Returning to FIG. 8, data analysis platform may determine a recommended change to an operating parameter of the plant. In one or more embodiments, in step 805, data analysis platform may send a command to automatically adjust the operating parameter of the plant. For example, data analysis platform may send a command to adjust an operating velocity of the plant, so as to increase a predicted life of the ARL. This increase in the predicted life of the ARL may be based on a predicted erosion rate and a planned turnaround date, and the adjustment to the operating parameter may be recommended in order that the plant can make it to the planned turnaround date before the ARL is completely eroded. In step 806, control platform may adjust the operating parameter based on the command from the data analysis platform. For example, control platform may adjust a valve, adjust a flow rate, adjust a temperature, adjust a velocity, adjust a pressure, and/or the like.

Conclusion

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

What is claimed is:

1. A system comprising:
a reactor configured to perform a fluid catalytic cracking process, the reactor including a cyclone with an abrasion resistant lining on an interior wall of the cyclone;
a gas flow rate sensor configured to measure a feed velocity of a feed to the cyclone;
a data analysis platform comprising:
  a processor of the data analysis platform;
  memory of the data analysis platform, the memory storing executable instructions that, when executed, cause the data analysis platform to:
    receive feed velocity data from the gas flow rate sensor, the feed velocity data indicating the feed velocity of the feed to the cyclone;
    determine an erosion rate of the abrasion resistant lining on the interior wall of the cyclone based on the feed velocity of the feed to the cyclone;
    based on the erosion rate, determine a recommended adjustment to an operating parameter of the reactor;
    send the recommended adjustment to the operating parameter of the reactor; and
a control platform comprising:
  a processor of the control platform; and
  memory of the control platform, the memory storing executable instructions that, when executed, cause the control platform to:
    receive the recommended adjustment to the operating parameter of the reactor; and
    adjust the operating parameter of the reactor.

2. The system of claim 1, wherein the executable instructions of the memory of the data analysis platform, when executed, cause the data analysis platform to:
determine a catalyst particle loading in an inlet feed flow to the cyclone.

3. The system of claim 1, wherein the executable instructions of the memory of the data analysis platform, when executed, cause the data analysis platform to:
determine an average bulk density of a catalyst used in the cyclone.

4. The system of claim 1, wherein the executable instructions of the memory of the data analysis platform, when executed, cause the data analysis platform to:
determine an average particle size of a catalyst used in the cyclone.

5. The system of claim 1, wherein the executable instructions of the memory of the data analysis platform, when executed, cause the data analysis platform to:
generate a dashboard displaying the erosion rate of the abrasion resistant lining on the interior wall of the cyclone.

6. The system of claim 1, wherein the executable instructions of the memory of the data analysis platform, when executed, cause the data analysis platform to:
determine a first exponent based on a length-to-diameter ratio of the cyclone.

7. The system of claim 6, wherein the executable instructions of the memory of the data analysis platform, when executed, cause the data analysis platform to:
determine a cyclone inlet scroll of the cyclone; and
determine a second exponent based on the cyclone inlet scroll of the cyclone.

8. The system of claim 7, wherein the executable instructions of the memory of the data analysis platform, when executed, cause the data analysis platform to:
determine an average exponent of the first exponent and the second exponent.

9. The system of claim 8, wherein the executable instructions of the memory of the data analysis platform, when executed, cause the data analysis platform to:
use the feed velocity of the feed to the cyclone and the average exponent to determine a daily erosion rate of the abrasion resistant lining on the interior wall of the cyclone.

10. The system of claim 9, wherein the executable instructions of the memory of the data analysis platform, when executed, cause the data analysis platform to:
determine a cumulative erosion over a period of time using the daily erosion rate of the abrasion resistant lining on the interior wall of the cyclone.

11. The system of claim 1, wherein the executable instructions of the memory of the data analysis platform, when executed, cause the data analysis platform to:
receive first data indicating a first thickness of the abrasion resistant lining on the interior wall of the cyclone at a first time;
receive second data indicating a second thickness of the abrasion resistant lining on the interior wall of the cyclone at a second time; and
use the first data indicating the first thickness and the second data indicating the second thickness to calibrate the data analysis platform.

12. The system of claim 1, wherein the executable instructions of the memory of the data analysis platform, when executed, cause the data analysis platform to:
predict an erosion rate for the abrasion resistant lining on the interior wall of the cyclone over a future run of the cyclone.

13. One or more non-transitory computer-readable media storing executable instructions that, when executed, cause a system to:
receive feed velocity data from a gas flow rate sensor configured to measure a feed velocity of a feed to a cyclone that is part of a reactor, the feed velocity data indicating the feed velocity of the feed to the cyclone;
determine an erosion rate of the abrasion resistant lining on the interior wall of the cyclone based on the feed velocity of the feed to the cyclone;
based on the erosion rate, determine a recommended adjustment to an operating parameter of the reactor;
send a command configured to cause the recommended adjustment to the operating parameter of the reactor.

14. The one or more non-transitory computer-readable media of claim 13, wherein the executable instructions, when executed, cause the system to:
determine a catalyst particle loading in an inlet feed flow to the cyclone;

determine an average bulk density of a catalyst used in the cyclone; and determine an average particle size of a catalyst used in the cyclone.

15. The one or more non-transitory computer-readable media of claim 13, wherein the executable instructions, when executed, cause the system to:

determine a first exponent based on a length-to-diameter ratio of the cyclone;

determine a cyclone inlet scroll of the cyclone;

determine a second exponent based on the cyclone inlet scroll of the cyclone;

determine an average exponent of the first exponent and the second exponent;

use the feed velocity of the feed to the cyclone and the average exponent to determine a daily erosion rate of the abrasion resistant lining on the interior wall of the cyclone; and determine a cumulative erosion over a period of time using the daily erosion rate of the abrasion resistant lining on the interior wall of the cyclone.

16. The one or more non-transitory computer-readable media of claim 13, wherein the executable instructions, when executed, cause the system to:

receive first data indicating a first thickness of the abrasion resistant lining on the interior wall of the cyclone at a first time;

receive second data indicating a second thickness of the abrasion resistant lining on the interior wall of the cyclone at a second time; and use the first data indicating the first thickness and the second data indicating the second thickness to calibrate the data analysis platform.

17. A method comprising:

receiving, by a data analysis system comprising a processor and memory, feed velocity data from a gas flow rate sensor configured to measure a feed velocity of a feed to a cyclone that is part of a reactor, the feed velocity data indicating the feed velocity of the feed to the cyclone;

determining, by the data analysis system, an erosion rate of the abrasion resistant lining on the interior wall of the cyclone based on the feed velocity of the feed to the cyclone;

based on the erosion rate, determining, by the data analysis system, a recommended adjustment to an operating parameter of the reactor;

sending, by the data analysis system, a command configured to cause the recommended adjustment to the operating parameter of the reactor.

18. The method of claim 17, comprising:

determining, by the data analysis system, a catalyst particle loading in an inlet feed flow to the cyclone;

determining, by the data analysis system, an average bulk density of a catalyst used in the cyclone; and determining, by the data analysis system, an average particle size of a catalyst used in the cyclone.

19. The method of claim 17, comprising:

determining, by the data analysis system, a first exponent based on a length-to-diameter ratio of the cyclone;

determining, by the data analysis system, a cyclone inlet scroll of the cyclone;

determining, by the data analysis system, a second exponent based on the cyclone inlet scroll of the cyclone;

determining, by the data analysis system, an average exponent of the first exponent and the second exponent;

using, by the data analysis system, the feed velocity of the feed to the cyclone and the average exponent to determine a daily erosion rate of the abrasion resistant lining on the interior wall of the cyclone; and determining, by the data analysis system, a cumulative erosion over a period of time using the daily erosion rate of the abrasion resistant lining on the interior wall of the cyclone.

20. The method of claim 17, comprising:

receiving, by the data analysis system, first data indicating a first thickness of the abrasion resistant lining on the interior wall of the cyclone at a first time;

receiving, by the data analysis system, second data indicating a second thickness of the abrasion resistant lining on the interior wall of the cyclone at a second time; and using, by the data analysis system, the first data indicating the first thickness and the second data indicating the second thickness to calibrate the data analysis platform.

* * * * *